United States Patent Office 3,247,137
Patented Apr. 19, 1966

3,247,137
POLYMER OF A MONOEPOXY ALCOHOL AND REACTION PRODUCTS THEREOF
Charles W. McGary, Jr., and Charles T. Patrick, Jr., South Charleston, W. Va., assignors to Union Carbide Corporation, a corporation of New York
No Drawing. Filed Dec. 28, 1960, Ser. No. 78,872
19 Claims. (Cl. 260—18)

This invention relates to monoepoxy alcohol compounds. In one aspect, the invention relates to the preparation of novel polyhydric polymers which result from the polymerization of monoepoxy alcohol compounds. In another aspect, the invention relates to novel drying and non-drying coating compositions which result from the reaction of the above-said polyhydric polymers and an aliphatic monocarboxylic acid.

The novel polyhydric polymers which are obtained in accordance with the teachings herein disclosed have extraordinary and outstanding utility as a component in the preparation of drying and non-drying coating compositions. These polyhydric polymers are prepared by polymerizing a monoepoxy alcohol compound, or a mixture of monoepoxy alcohol compounds, in the presence of various catalysts, as will be explained hereinafter. The reaction of said polyhydric polymers with aliphatic monocarboxylic acids yields novel coating compositions which have excellent solubility in various inexpensive solvents, and which have a myriad of useful and unexpected characteristics. It has been observed that the novel coating compositions when cured exhibit, for example, excellent water, caustic and chemical resistance; excellent adhesion, toughness, and flexibility; excellent color stability and outstanding retention of gloss upon exposure to light and weathering; and/or extraordinary hardness as indicated by Sward values of upward to about 90, and greater, as compared to values of less than 40 for films prepared from commercial drying oil compositions.

The novel curable, polymerizable compositions which yield the novel polyhydric polymers comprises a monoepoxy alcohol compound(s) and a polymerization catalyst therefor. A single monoepoxy alcohol compound, or a mixture of monoepoxy alcohol compounds, can be employed. Among the catalyst contemplated include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron-trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzenesulfonic acid, and the like. In addition, the tetraalkyl titanates, e.g., tetraethyl titanate, tetraisopropyl titanate, tetrabutyl titanate, and the like, also are contemplated. Basic catalysts, though not as preferred as the above exemplified acidic catalysts, also can be employed. Illustrative basic catalysts include, for instance, the alkali metal hydroxides, e.g., sodium hydroxide, potassium hydroxide, and the like; the amines, e.g., alpha-methylbenzyldimethylamine, dimethylethylamine, triethylamine, tripropylamine, trimethylammonium hydroxide, and the like.

The concentration of the polymerization catalyst can range from about 0.01, and lower, to about 10.0, and higher, weight percent, based on the weight of monoepoxy alcohol compound(s). The polymerization reaction can be effected over a wide temperature range, e.g., from about 0° C. to about 225° C., and higher. A temperature in the range of from above about 25° C. to about 150° C. is preferred. The optimum temperature will depend, in the main, on various factors such as the particular monoepoxy alcohol component(s) employed, the particular catalyst employed, the concentration of the catalyst, the use of an inert normally liquid organic vehicle, and other considerations. The polymerization reaction time can vary from several minutes to several days, e.g., from 10 minutes to 24 hours, and longer, depending upon the correlation of such factors as illustrated above.

The polymerization reaction can be carried out via the bulk, suspension, or solution polymerization routes. The suspension and solution techniques involve the use of an inert normally-liquid organic medium such as, for instance, the aromatic hydrocarbons, e.g., benzene, toluene, xylene, ethylbenzene, and the like; various oxygenated organic compounds such as anisole, dioxane, tetrahydrofuran, butyl acetate, amyl acetate, cyclohexanone, the dimethyl and diethyl ethers of ethylene glycol, of propylene glycol, of diethylene glycol, and the like; the normally-liquid saturated hydrocarbons including the open chain, cyclic, and alkyl-substituted cyclic saturated hydrocarbons such as, the hexanes, the heptanes, the octanes, 2-ethylhexane, cyclopentane, cyclohexane, cycloheptane, the lower alkyl substituted-cyclopentanes, the lower alkyl substituted-cyclohexanes, the lower alkyl substituted-cycloheptanes, various normally-liquid petroleum hydrocarbon fractions, decahydronaphthalene, and the like.

The resulting polyhydric polymeric product can be recovered from the inert normally-liquid organic vehicle (if one is employed) by various well known expediencies. For example, if the organic vehicle is a suspending medium, i.e., a vehicle in which the polymeric product is essentially insoluble, then filtration, decantation, and the like, are typical means for recovering the suspended polymer. The recovered polymer then can be dried by heating under reduced pressure, if desired. If the resulting polyhydric polymeric product is soluble in the organic vehicle which is employed in the polymerization reaction, then the polymeric product can be recovered from the solution via the technique of precipitation. This can be accomplished by adding to the solution an inert liquid which is miscible with said organic vehicle but which is a non-solvent for the polymer product. Of course, the polymeric product, also can be recovered from solution by heating said solution to thus drive off the organic vehicle. If desired, the resulting solution or suspension which contains the polymeric product can be employed in the esterification reaction without removing the organic vehicle therefrom. In addition, the resulting polyhydric polymeric product can be subjected to a wash treatment such as with water, an aqueous caustic solution, lower aliphatic alcohols, etc., to thus remove impurities, e.g., catalytic ash, therefrom.

The polymerization of the monoepoxy alcohol compound(s) involves the reaction of a vicinal epoxy group

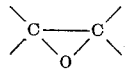

of one molecule with the hydroxy group of another molecule. When a single monoepoxy alcohol compound is employed, the resulting product is a homopolymer. A mixture of two or more monoepoxy alcohol compounds results, of course, in a copolymeric product. By way of illustration, if one structurally designates the monoepoxy alcohol compound as follows:

I 

wherein $a$ is an integer which has a value, preferably, of from 1 to 6 inclusive, and wherein $X$ represents the remainder of the monoepoxy alcohol molecule excluding the vicinal epoxy group, i.e.,

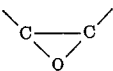

and the alcoholic hydroxy group(s), i.e., —OH; then the resulting homopolymer is characterized as follows:

II 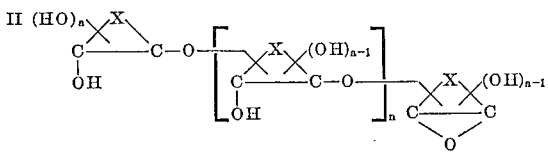

wherein $n$ represents a number which has a value greater than 2 and up to 1000, and higher. For use as an essential component in the preparation of drying oils, it is preferred that $n$ has a value of greater than 2 and up to about 100.

By way of a second illustration, if one desired to prepare a polyhydric copolymer in which the monomers employed were the monoepoxy alcohol compound illustrated in Formula I supra and the following monoepoxy alcohol compound:

III 

wherein $b$ is an integer which has a value, preferably, of from 1 to 6 inclusive, and wherein Y represents the remainder of the monoepoxy alcohol molecule excluding the vicinal epoxy group and the alcoholic hydroxy group(s); then a recurring unit of the resulting copolymer is as follows:

IV 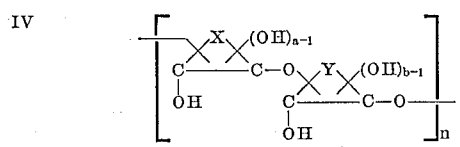

It is apparent, therefore, that the reaction of the hydroxy group with the epoxy group results in the generation of hydroxy groups along the polymer chain. Thus, the polymeric product is aptly termed a polyhydric polymer. In addition, whether a homopolymer or copolymer is prepared, a recurring unit therein is characterized as follows:

V 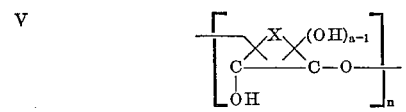

Moreover, the resulting polyhydric polymeric products of the invention are soluble in various common liquid organic media, and said products range from the viscous liquid state to the fusible, thermoplastic solid state.

Extremely useful and valuable varnishes or coating compositions can be prepared by the esterification reaction of the above described polyhydric polymers with an aliphatic monocarboxylic acid. Among the aliphatic monocarboxylic acids contemplated include the saturated and ethylenically unsaturated acids. The ethylenically unsaturated aliphatic monocarboxylic acids are preferred. Illustrative acids include, for instance, butanoic acid, hexanoic acid, caprylic acid, lauric acid, capric acid, myristic acid, oleic acid, linoleic acid, stearic acid, licanic acid, ricinoleic acid, hexenoic acid, hexadienoic acid, octenoic acid. Acids derived from natural sources such as, for example, castor oil, dehydrated castor oil, coconut oil, cottonseed oil, oiticaca oil, perilla oil, olive oil, safflower oil, sardine oil, soyabean oil, tall oil, linseed oil, sunflower seed oil, walnut oil, menhaden oil, poppy-seed oil, tung oil, and mixtures thereof, are advantageous both from an economy standpoint and since highly useful varnishes result from the esterification reaction. If desired, the reaction can be effected in the presence of from about 0.01, and lower to 10.0 weight percent, and higher, based on the total weight of the reactants, of a catalyst such as those described previously, and also, the reaction can be conducted in the presence of an inert normally-liquid organic medium. Suitable media include, for instance, the aromatic hydrocarbons, e.g., benzene, toluene, xylene, ethylbenzene, and the like; the saturated aliphatic and cycloaliphatic hydrocarbons, e.g., hexane, heptane, cyclopentane, cyclohexane, lower alkyl substituted-cyclohexane, and the like; the oxygenated organic compounds, e.g., acetone, methyl ethyl ketone, methyl isobutyl ketone, cyclohexanone, tetrahydrofuran, dioxane, diisopropyl ether, diethyl ether, and the like. The aromatic hydrocarbons are preferred.

The above-described esterification reaction can be conducted at a temperature in the range of from about 100° C., and lower, to about 300° C., and higher, and preferably, from about 150° C. to about 250° C. The reaction period can vary from several minutes to several days depending, of course, on factors such as the reaction temperature, the concentrations and reactivities of the reactants, the presence or absence of a catalyst, and the like. In general, a reaction period of from about 0.5 to about 24 hours is suitable. Water resulting from the esterification reaction can be removed by methods well known to the art.

The proportions of the polyhydric polymer and aliphatic monocarboxylic acid which are employed in the esterification reaction most conveniently are expressed in terms of hydroxy (—OH) groups and carboxy (—COOH) groups. Highly useful varnish or coating compositions are obtained by employing from about 0.1 to 1.0 carboxy group of the aliphatic monocarboxylic acid per hydroxy group of the polyhydric polymer, and preferably, from about 0.2 to 0.9 carboxy group per hydroxy group.

The esterification products of the polyhydric polymer and aliphatic monocarboxylic acid generally are obtained as solid or solid-like products. These products can be classified as drying compositions or non-drying compositions. The former are those which contain ethylenic unsaturation whereas the latter are saturated compositions. Both the drying and non-drying compositions are useful as modifiers for coating resins such as phenol-formaldehyde resins, melamine-formaldehyde resins, alkyd resins, and the like. These compositions are outstanding as modifiers because they have a wide range of compatability, they impart improvde caustic, water, and chemical resistance to the resin coatings they are modifying, and they impart improved flexibility and toughness. The drying compositions are capable of "drying" or curing to excellent protective coatings with or without the application of heat. It is generally desirable to employ various metallic salts of organic compounds known to the art as "driers," to accelerate the drying process. The drying can be accomplished at temperatures in the range of from about 10° to about 250° C. for a period of time sufficient to produce the desired property in the resin. The concentration of the drier compound can range from about 0.001 to about 5.0 weight percent, and higher, based on the weight of the drying compound (polymer). Suitable driers include soluble compounds containing heavy metals, e.g., cobalt, lead, manganese, calcium, zinc, iron, and the like. Examples of such driers include cobalt naphthenate, lead octanoate, and the like. The drying compositions can be treated in the various ways familiar to the varnish and paint industries to produce special or advantageous effects.

In a broad aspect, the polyhydric polymeric products which are contemplated as an ingredient in the preparation of the novel drying and non-drying coating compositions include the homopolymers and copolymers which result from the polymerization of a single monoepoxy alcohol compound, or a mixture of monoepoxy alcohol compounds. These monoepoxy alcohol compounds are characterized in that they are free of ethylenic, acetylenic, and benzenoid unsaturation, they contain a single oxirane oxygen atom bonded to vicinal cycloaliphatic carbon atoms, and they contain at least one alcoholic hydroxy group. It should be noted that the term "alcoholic hydroxy group," as used herein including the appended claims, refers to a hydroxy radical (—OH) which is monovalently bonded to an aliphatic or cycloaliphatic carbon atom. In contrast, the term "phenolic hydroxy group" refers to a hydroxy radical which is monovalently bonded to a benzenoid carbon atom, i.e., a carbon atom which is a part of the benzene ring. Those saturated monoepoxy alcohol compounds which contain solely carbon, hydrogen, and oxygen atoms are preferred. These polyhydric polymeric products contain, as indicated previously, a plurality of free hydroxy groups, and they can range from viscous liquids to fusible, thermoplastic solids.

In various embodiments, the polyhydric polymeric products which are contemplated as an ingredient in the preparation of the novel drying and non-drying coating compositions include not only the novel homopolymers and copolymers of the monoepoxy alcohol compounds which will be enumerated hereinafter as (a) through (v), but also the polyhydric homopolymers of the mono vicinal epoxycyclopentanols, e.g., 2,3-epoxycyclopentanol, 3,4-epoxycyclopentanol, lower alkyl substituted-2,3-epoxycyclopentanol, 4-methyl-2,3-epoxycyclopentanol, and the like; the polyhydric homopolymers of the mono vicinal-epoxycyclopentylalkanols, e.g., 2,3 - epoxycyclopentyl-methanol, 3,4-epoxycyclopentylmethanol, 3,4-epoxycyclopentylpropanol, lower alkyl substituted-2,3-epoxycyclopentylmethanol, and the like; the mono vicinal-epoxybicycloalkanols, e.g., 3-oxatricyclo[3.2.1.0$^{2,4}$]octan-6-ol, 3-oxatricyclo[3.2.1.0$^{2,4}$]octane-6,7-diol, lower alkyl substituted - 3 - oxatricyclo[3.2.1.0$^{2,4}$]octan - 6 - ol, lower alkyl substituted - 3 - oxatricyclo[3.2.1.0$^{2,4}$]octane - 6,7 - diol, and the like; and polyhydric copolymers obtained via the polymerization of a mixture containing at least two of the above exemplified monoepoxy alcohol monomers. It is pointed out that the expression "lower alkyl," as used herein, refers to a monovalent saturated aliphatic hydrocarbon radical which contains from 1 to 4 carbon atoms.

The monoepoxy alcohol compounds which are contemplated in the preparation of the novel fusible polyhydroxy-containing polymers include:

(a) 4-oxatetracyclo[6.2.1.0$^{2,7}$.0$^{3,5}$]undecan-9-ol,
(b) 4-oxatetracyclo[6.2.1.0$^{2,7}$.0$^{3,5}$]undec-9-oxyalkanol,
(c) 4-oxatetracyclo[6.2.1.0$^{2,7}$.0$^{3,5}$]undec-9-oxyalkane-poly-ol,
(d) 4-oxatetracyclo[6.2.1.0$^{2,7}$.0$^{3,5}$]undecane-9,10-diol,
(e) 4-oxatetarcyclo[6.2.1.0$^{2,7}$.0$^{3,5}$]undecane-10,11-diol,
(f) 10-oxapentacyclo[6.3.1.1$^{3,6}$.0$^{2,7}$.0$^{9,11}$]tridecan-4-ol,
(g) 10-oxapentacyclo[6.3.1.1$^{3,6}$.0$^{2,7}$.0$^{9,11}$]tridecane-4,5-diol,
(h) 10-oxapentacyclo[6.3.1.1$^{3,6}$.0$^{2,7}$.0$^{9,11}$]tridec-4-ylalkanol,
(i) 10-oxapentacyclo[6.3.1.1$^{3,6}$.0$^{2,7}$.0$^{9,11}$]tridec-4,5-ylene-dialkanol,
(j) 10-oxapentacyclo[6.3.1.1$^{3,6}$.0$^{2,7}$.0$^{9,11}$]tridec-4-oxyalkanol,
(k) 10-oxapentacyclo[6.3.1.1$^{3,6}$.0$^{2,7}$.0$^{9,11}$]tridec-4-oxyalkane-poly-ol,
(l) 10-oxapentacyclo[6.3.1.1$^{3,6}$.0$^{2,7}$.0$^{9,11}$]tridec-4-ylmethylene-oxyalkanol,
(m) 10-oxapentacyclo[6.3.1.1$^{3,6}$.0$^{2,7}$.0$^{9,11}$]tridec-4-ylmethylene-oxyalkane-poly-ol,
(n) The 4-oxatetracyclo[6.2.1.0$^{2,7}$.0$^{3,5}$]undec-9-oxy-(mono- and polyalkyleneoxy)alkanols, which result from the monoepoxidation of the reaction products of tricyclo[5.2.1.0$^{2,6}$]dec-3-ene-8-ol with a saturated aliphatic mono vicinal-epoxyhydrocarbon.
(o) The 4-oxatetracyclo[6.2.1.0$^{2,7}$.0$^{3,5}$]undec-9,10-ylene-di[oxy(mono- and polyalkyleneoxy) alkanols] which result from the monoepoxidation of the reaction products of tricyclo[5.2.1.0$^{2,6}$]dec-3-ene-8,9-diol with a saturated aliphatic mono vicinal-epoxyhydrocarbon,
(p) The 4 - oxatetracyclo[6.2.1.0$^{2,7}$.0$^{3,5}$]undec - 10,11-ylene - di[oxy(mono- and polyalkyleneoxy)alkanols] which result from the monoepoxidation of the reaction products of tricyclo[5.2.1.0$^{2,6}$]dec-3-ene-9,10-diol with a saturated aliphatic mono vicinal-epoxyhydrocarbon,
(q) The 10 - oxapentacyclo[6.3.1.1$^{3,6}$.0$^{2,7}$.0$^{9,11}$]tridec-4-oxy(mono- and polyalkyleneoxy)alkanols which result from the monoepoxidation of the reaction products of tetracyclo[6.2.1.1$^{3,6}$.0$^{2,7}$]dodec-9-en-4-ol with a saturated aliphatic mono vicinal-epoxyhydrocarbon,
(r) The 10 - oxapentacyclo[6.3.1.1$^{3,6}$.0$^{2,7}$.0$^{9,11}$]tridec-4,5-ylene - di[oxy(mono- and polyalkyleneoxy)alkanols] which result from the monoepoxidation of the reaction products of tetracyclo[6.2.1.1$^{3,6}$.0$^{2,7}$]dodec - 9 - ene-4,5-diol with a saturated aliphatic mono vicinal-epoxyhydrocarbon,
(s) 10-oxapentacyclo[6.3.1.1$^{3,6}$.0$^{2,7}$.0$^{9,11}$]tridec - 4 - ylalkyleneoxyalkanol,
(t) The 10 - oxapentacyclo[6.3.1.1$^{3,6}$.0$^{2,7}$.0$^{9,11}$]tridec-4-ylalkyleneoxy(mono- and polyalkyleneoxy)alkanols which result from the monoepoxidation of the reaction products of tetracyclo[6.2.1.1$^{3,6}$.0$^{2,7}$]dodec - 9 - en-4-ylalkanol with a saturated aliphatic mono vicinal-epoxyhydrocarbon,
(u) 10 - oxapentacyclo[6.3.1.1$^{3,6}$.0$^{2,7}$.0$^{9,11}$]tridec - 4,5-ylene-di(alkyleneoxyalkanol), and
(v) The 10 - oxapentacyclo[6.3.1.1$^{3,6}$.0$^{2,7}$.0$^{9,11}$]tridec-4,5-ylene - di[alkylenoxy(mono- and polyalkyleneoxy) alkanols] which result from the monoepoxidation of the reaction products of tetracyclo[6.2.1.1$^{3,6}$.0$^{2,7}$]dodec-9-en-4,5-ylene-dialkanol with a saturated aliphatic mono vicinal-epoxyhydrocarbon.

Specific examples of the 4-oxatetracyclo[6.2.1.0$^{2,7}$.0$^{3,5}$]undec-9-oxyalkanols include, for instance, 4-oxatetracyclo[6.2.1.0$^{2,7}$.0$^{3,5}$]undec-9-oxy-n-pentanol,
4-oxatetracyclo[6.2.1.0$^{2,7}$.0$^{3,5}$]undec-9-oxyethanol,
4-oxatetracyclo[6.2.1.0$^{2,7}$.0$^{3,5}$]undec-9-oxy-n-propanol,
4-oxatetracyclo[6.2.1.0$^{2,7}$.0$^{3,5}$]undec-9-oxyisopropanol,
4-oxatetracyclo[6.2.1.0$^{2,7}$.0$^{3,5}$]undec-9-oxy-n-butanol,
4-oxatetracyclo[6.2.1.0$^{2,7}$.0$^{3,5}$]undec-9-oxyisobutanol,
4-oxatetracyclo[6.2.1.0$^{2,7}$.0$^{3,5}$]undec-9-oxy-t-butanol,
4-oxatetracyclo[6.2.1.0$^{2,7}$.0$^{3,5}$]undec-9-oxy-n-hexanol,
4-oxatetracyclo[6.2.1.0$^{2,7}$.0$^{3,5}$]undec-9-oxy-n-octanol,
4-oxatetracyclo[6.2.1.0$^{2,7}$.0$^{3,5}$]undec-9-oxy-n-decanol,
and the like.

Illustrative examples of the 4-oxatetracyclo[6.2.1.0$^{2,7}$.0$^{3,5}$]undec-9-oxyalkane-poly-ols which are contemplated include, for instance, the 4-oxatetracyclo[6.2.1.0$^{2,7}$.0$^{3,5}$]undec-9-oxyalkanediols, e.g., The 4-oxatetracyclo[6.2.1.0$^{2,7}$.0$^{3,5}$]undec-9-oxypropanediols,
The 4-oxatetracyclo[6.2.1.0$^{2,7}$.0$^{3,5}$]undec-9-oxybutanediols,
The 4-oxatetracyclo[6.2.1.0$^{2,7}$.0$^{3,5}$]undec-9-oxypentanediols,
The 4-oxatetracyclo[6.2.1.0$^{2,7}$.0$^{3,5}$]undec-9-oxyhexanediols, and the like;
The 4-oxatetracyclo[6.2.1.0$^{2,7}$.0$^{3,5}$]undec-9-oxyalkanetriols, e.g.,
The 4-oxatetracyclo[6.2.1.0$^{2,7}$.0$^{3,5}$]undec-9-oxybutanetriols,
The 4-oxatetracyclo[6.2.1.0$^{2,7}$.0$^{3,5}$]undec-9-oxypentanetriols,
The 4-oxatetracyclo[6.2.1.0$^{2,7}$.0$^{3,5}$]undec-9-oxyhexanetriols,
The 4-oxatetracyclo[6.2.1.0$^{2,7}$.0$^{3,5}$]undec-9-oxyoctanetriols, and the like;
The 4-oxatetracyclo[6.2.1.0$^{2,7}$.0$^{3,5}$]undec-9- oxyalkanetetrols, e.g.,

The 4-oxatetracyclo[6.2.1.0$^{2,7}$.0$^{3,5}$]undec-9-oxyhexanetetrols, and the like;

The 4-oxatetracyclo[6.2.1.0$^{2,7}$.0$^{3,5}$]undec-9-oxyalkanepentols, and the like.

Typical 10-oxapentacyclo[6.3.1.1$^{3,6}$.0$^{2,7}$.0$^{9,11}$]tridec-4-ylalkanols include, among others, 10-oxapentacyclo[6.3.1.1$^{3,6}$.0$^{2,7}$.0$^{9,11}$]tridec-4-ylmethanol,
10-oxapentacyclo[6.3.1.1$^{3,6}$.0$^{2,7}$.0$^{9,11}$]tridec-4-ylethanol,
10-oxapentacyclo[6.3.1.1$^{3,6}$.0$^{2,7}$.0$^{9,11}$]tridec-4-yl-n-propanol,
10-oxapentacyclo[6.3.1.1$^{3,6}$.0$^{2,7}$.0$^{9,11}$]tridec-4-ylisopropanol,
10-oxapentacyclo[6.3.1.1$^{3,6}$.0$^{2,7}$.0$^{9,11}$]tridec-4-yl-n-butanol,
10-oxapentacyclo[6.3.1.1$^{3,6}$.0$^{2,7}$.0$^{9,11}$]tridec-4-yl-t-butanol,
10-oxapentacyclo[6.3.1.1$^{3,6}$.0$^{2,7}$.0$^{9,11}$]tridec-4-ylisobutanol,
10-oxapentacyclo[6.3.1.1$^{3,6}$.0$^{2,7}$.0$^{9,11}$]tridec-4-ylisohexanol,
10-oxapentacyclo[6.3.1.1$^{3,6}$.0$^{2,7}$.0$^{9,11}$]tridec-4-yl-n-octan-2-ol,
10-oxapentacyclo[6.3.1.1$^{3,6}$.0$^{2,7}$.0$^{9,11}$]tridec-4-yl-n-decanol, and the like.

Among the 10-oxapentacyclo[6.3.1.1$^{3,6}$.0$^{2,7}$.0$^{9,11}$]tridec-4-oxyalkanols which are encompassed within the scope of the invention are, for example, 10-oxapentacyclo[6.3.1.1$^{3,6}$.0$^{2,7}$.0$^{9,11}$]tridec-4-oxy-n-pentanol,
10-oxapentacyclo[6.3.1.1$^{3,6}$.0$^{2,7}$.0$^{9,11}$]tridec-4-oxyethanol,
10-oxapentacyclo[6.3.1.1$^{3,6}$.0$^{2,7}$.0$^{9,11}$]tridec-4-oxy-n-propanol,
10-oxapentacyclo[6.3.1.1$^{3,6}$.0$^{2,7}$.0$^{9,11}$]tridec-4-oxyisopropanol,
10-oxapentacyclo[6.3.1.1$^{3,6}$.0$^{2,7}$.0$^{9,11}$]tridec-4-oxy-n-butanol,
10-oxapentacyclo[6.3.1.1$^{3,6}$.0$^{2,7}$.0$^{9,11}$]tridec-4-oxyisobutanol,
10-oxapentacyclo[6.3.1.1$^{3,6}$.0$^{2,7}$.0$^{9,11}$]tridec-4-oxy-t-butanol,
10-oxapentacyclo[6.3.1.1$^{3,6}$.0$^{2,7}$.0$^{9,11}$]tridec-4-oxy-n-hexanol,
10-oxapentacyclo[6.3.1.1$^{3,6}$.0$^{2,7}$.0$^{9,11}$]tridec-4-oxy-n-octan-4-ol,
10-oxapentacyclo[6.3.1.1$^{3,6}$.0$^{2,7}$.0$^{9,11}$]tridec-4-oxy-n-dodecanol, and the like.

Illustrative 10-oxapentacyclo[6.3.1.1$^{3,6}$.0$^{2,7}$.0$^{9,11}$]tridec-4-oxyalkane-poly-ols include, for instance, The 10-oxapentacyclo[6.3.1.1$^{3,6}$.0$^{2,7}$.0$^{9,11}$]tridec-4-oxyalkanediols, e.g.,
The 10-oxapentacyclo[6.3.1.1$^{3,6}$.0$^{2,7}$.0$^{9,11}$]tridec-4-oxypropanediols,
The 10-oxapentacyclo[6.3.1.1$^{3,6}$.0$^{2,7}$.0$^{9,11}$]tridec-4-oxybutanediols,
The 10-oxapentacyclo[6.3.1.1$^{3,6}$.0$^{2,7}$.0$^{9,11}$]tridec-4-oxypentanediols,
The 10-oxapentacyclo[6.3.1.1$^{3,6}$.0$^{2,7}$.0$^{9,11}$]tridec-4-oxyhexanediols, and the like;
The 10-oxapentacyclo[6.3.1.1$^{3,6}$.0$^{2,7}$.0$^{9,11}$]tridec-4-oxyalkanetriols, e.g.,
The 10-oxapentacyclo[6.3.1.1$^{3,6}$.0$^{2,7}$.0$^{9,11}$]tridec-4-oxybutanetriols,
The 10-oxapentacyclo[6.3.1.1$^{3,6}$.0$^{2,7}$.0$^{9,11}$]tridec-4-oxypentanetriols,
The 10-oxapentacyclo[6.3.1.1$^{3,6}$.0$^{2,7}$.0$^{9,11}$]tridec-4-oxyhexanetriols,
The 10-oxapentacyclo[6.3.1.1$^{3,6}$.0$^{2,7}$.0$^{9,11}$]tridec-4-oxyoctanetriols,
The 10-oxapentacyclo[6.3.1.1$^{3,6}$.0$^{2,7}$.0$^{9,11}$]tridec-4-oxynonanetriols, and the like;
The 10-oxapentacyclo[6.3.1.1$^{3,6}$.0$^{2,7}$.0$^{9,11}$]tridec-4-oxyalkanetriols, e.g.,
The 10-oxapentacyclo[6.3.1.1$^{3,6}$.0$^{2,7}$.0$^{9,11}$]tridec-4-oxyhexanetetrols, and the like;
The 10-oxapentacyclo[6.3.1.1$^{3,6}$.0$^{2,7}$.0$^{9,11}$]tridec-4-oxyalkanepentols; and the like.

Typical 10-oxapentacyclo[6.3.1.1$^{3,6}$.0$^{2,7}$.0$^{9,11}$]-tridec-4-ylmethyleneoxyalkanols include, among others, 10-oxapentacycle[6.3.1.1$^{3,6}$.0$^{2,7}$.0$^{9,11}$]tridec-4-methylene-oxy-n-pentanol,
10-oxapentacyclo[6.3.1.1$^{3,6}$.0$^{2,7}$.0$^{9,11}$]tridec-4-ylmethylene-oxyethanol,
10-oxapentacyclo[6.3.1.1$^{3,6}$.0$^{2,7}$.0$^{9,11}$]tridec-4-ylmethylene-oxy-n-propanol,
10-oxapentacyclo[6.3.1.1$^{3,6}$.0$^{2,7}$.0$^{9,11}$]tridec-4-ylmethylene-oxyisopropanol,
10-oxapentacyclo[6.3.1.1$^{3,6}$.0$^{2,7}$.0$^{9,11}$]tridec-4-ylmethylene-oxy-n-butanol,
10-oxapentacyclo[6.3.1.1$^{3,6}$.0$^{2,7}$.0$^{9,11}$]tridec-4-ylmethylene-oxy-t-butanol,
10-oxapentacyclo[6.3.1.1$^{3,6}$.0$^{2,7}$.0$^{9,11}$]tridec-4-ylmethylene-oxy-n-hexanol,
10-oxapentacyclo[6.3.1.1$^{3,6}$.0$^{2,7}$.0$^{9,11}$]tridec-4-ylmethylene-oxy-n-octanol,
10-oxapentacyclo[6.3.1.1$^{3,6}$.0$^{2,7}$.0$^{9,11}$]tridec-4-lymethylene-oxy-n-dodecanol, and the like.

Illustrative 10-oxapentecyclo[6.3.1.1$^{3,6}$.0$^{2,7}$.0$^{9,11}$]tridec-4-ylmethyleneoxyalkane-poly-ols which are contemplated include, for instance the The 10-oxapentacyclo[6.3.1.1$^{3,6}$.0$^{2,7}$.0$^{9,11}$]tridec-4-yl-methyleneoxyalkanediols, e.g.,
The 10-oxapentacyclo[6.3.1.1$^{3,6}$.0$^{2,6}$.0$^{9,11}$]tridec-4-ylmethyleneoxypropanediols,
The 10-oxapentacyclo[6.3.1.1$^{3,6}$.0$^{2,7}$.0$^{9,11}$]tridec-4-ylmethyleneoxybutanediols,
The 10-oxapentacyclo[6.3.1.1$^{3,6}$.0$^{2,7}$.0$^{9,11}$]tridec-4-ylmethyleneoxypentanediols,
The 10-oxapentacyclo[6.3.1.1$^{3,6}$.0$^{2,7}$.0$^{9,11}$]tridec-4-ylmethyleneoxyhexanediols,
The 10-oxapentacyclo[6.3.1.1$^{3,6}$.0$^{2,7}$.0$^{9,11}$]tridec-4-ylmethyleneoxyoctanediols, and the like;
The 10-oxapentacyclo[6.3.1.1$^{3,6}$.0$^{2,7}$.0$^{9,11}$]tridec-4-ylmethyleneoxyalkanetriols, e.g.,
The 10-oxapentacyclo[6.3.1.1$^{3,6}$.0$^{2,7}$.0$^{9,11}$]tridec-4-ylmethyleneoxybutanetriols,
The 10-oxapentacyclo[6.3.1.1$^{3,6}$.0$^{2,7}$.0$^{9,11}$]tridec-4-ylmethyleneoxypentanetriols,
The 10-oxapentacyclo[6.3.1.1$^{3,6}$.0$^{2,7}$.0$^{9,11}$]tridec-4-ylmethyleneoxyhexanetriols,
The 10-oxapentacyclo[6.3.1.1$^{3,6}$.0$^{2,7}$.0$^{9,11}$]tridec-4-ylmethyleneoxyoctanetriols,
The 10-oxapentacyclo[6.3.1.1$^{3,6}$.0$^{2,7}$.0$^{9,11}$]tridec-4-ylmethyleneoxynonanetriols, and the like;
The 10-oxapentacyclo[6.3.1.1$^{3,6}$.0$^{2,7}$.0$^{9,11}$]tridec-4-ylmethyleneoxyalkanetetrols, e.g.,
The 10-oxapentacyclo[6.3.1.1$^{3,6}$.0$^{2,7}$.0$^{9,11}$]tridec-4-ylmethyleneoxyhexanetetrols, and the like;
The 10-oxapentacyclo[6.3.1.1$^{3,6}$.0$^{2,7}$.0$^{9,11}$]tridec-4-ylmethyleneoxyalkanepentols; and the like.

The 10-oxapentacyclo[6.3.1.1$^{3,6}$.0$^{2,7}$.0$^{9,11}$]tridec-4,5-ylene-dialkanals are exemplified, preferably, by such compounds as 10-oxapentacyclo[6.3.1.1$^{3,6}$.0$^{2,7}$.0$^{9,11}$]tridec-4,5-ylene-dimethanol, 10-oxapentacyclo-[6.3.1.1$^{3,6}$.0$^{2,7}$.0$^{9,11}$]-tridec14,5-ylene-diethanol, and the like.

The preparation of 4-oxatetracyclo[6.2.1.0$^{2,7}$.0$^{3,5}$]undecan-9-ol is effected by the reaction of dicyclopentadiene with an aqueous solution of an inorganic acidic catalyst, e.g., an aqueous solution of 25 weight percent sulfuric acid, at an elevated temperature, e.g., from about 75° C. and lower, to about 125° C., and higher, and for a period of time sufficient to produce tricyclo[5.2.1.0$^{2,6}$]dec-3-en-8-ol as the product. Epoxidation of the resulting olefinically unsaturated alcohol product results in 4-oxatetracyclo[6.2.1.0$^{2,7}$.0$^{3,5}$]undecan-9-ol. It is pointed out at this time that the epoxidation reaction of the olefinically unsaturated alcohol precursors which result in the monoepoxy alcohol compounds that are employed as a component(s) in the novel curable system of the invention will be described in detail at a later section of the specification.

The preparation of 4-oxatetracyclo[6.2.1.0$^{2,7}$.0$^{3,5}$]undec-9-oxyalkanol,
4-oxatetracyclo[6.2.1.0$^{2,7}$.0$^{3,5}$]undec-9-oxyalkane-poly-ol,
10-oxapentacyclo[6.3.1.1$^{3,6}$.0$^{2,6}$.0$^{9,11}$]tridec-4-oxyalkanol, or
10-oxapentacyclo[6.3.1.1$^{3,6}$.0$^{2,7}$.0$^{9,11}$]tridec-4-oxyalkane-poly-ol is accomplished, for example, by reacting a molar excess of a polyhydric alcohol, e.g., ethylene glycol, glycerol, 1,2,6-hexanetriol, erythritol, pentaerythritol, and the like, with dicyclopentadiene or tetracyclo[6.2.1.1$^{3,6}$.0$^{2,7}$]dodeca-4,9-diene, in the presence of boron trifluoride catalyst, at an elevated temperature, e.g., from about 50° C., and lower, to about 125° C. and higher, and for a period of time to produce tricyclo[5.2.1.0$^{2,6}$]dec-3-en-8-oxyalkanol,
tricyclo[5.2.1.0$^{2,6}$]dec-3-en-8-oxyalkane-poly-ol,
tetracyclo[6.2.1.1$^{3,6}$.0$^{2,7}$]dodec-9-en-4-oxyalkanol, or
tetracyclo[6.2.1.1$^{3,6}$.0$^{2,7}$]dodec-9-en-4-oxyalkane-poly-ol as the product. Epoxidation of the resulting product gives the monoepoxy alcohol compounds under considertion.

The preparation of 4-oxatetracyclo[6.2.1.0$^{2,7}$.0$^{3,5}$]undecane9,10-diol or
10-oxapentacyclo[6.3.1.1$^{3,6}$.0$^{2,7}$.0$^{9,11}$]tridecane-4,5-diol is effected, for example, by reacting dicyclopentadiene or tetracyclo[6.2.1.1$^{3,6}$.0$^{2,7}$]dodeca-4,9-diene with aqueous hydrogen peroxide (equimolar concentration), in the presence of osmium tetroxide catalyst, at an elevated temperature, and for a period of time sufficient to produce tricyclo[5.2.1.0$^{2,6}$]dec-3-ene-8,9-diol or
tetracyclo[6.2.1.1$^{3,6}$.0$^{2,7}$]dodec-9-ene-4,5-diol as the product. Epoxidation of the resulting product produces the monoepoxy alcohol compound.

Monomeric 4-oxatetracyclo[6.2.1.0$^{2,7}$.0$^{3,5}$]undecane-10,11-diol can be prepared by the reaction of dicyclopentadiene and lead tetraacetate, under the influence of heat, to yield tricyclo[5.2.1.0$^{2,6}$]dec-3-ene-9,10-diol, followed by epoxidizing said diol to obtain the monoepoxy alcohol compound in question.

The preparation of 10-oxapentacyclo[6.3.1.1$^{3,6}$.0$^{2,7}$.0$^{9,11}$]tridecan-4-ol is as follows. The Diels-Adler reaction of equimolar quantities of cyclopentadiene and vinyl acetate results in 5-acetoxy-bicyclo[2.2.1]hept-2-ene. Subsequent reaction of the bicyclo product with cyclopentadiene yields 4-acetoxy-tetracyclo[6.2.1.1$^{3,6}$.0$^{2,7}$]dodec-9-ene. The reaction of the tetracyclo product with potassium hydroxide yields tetracyclo[6.2.1.1$^{3,6}$.0$^{2,7}$]dodec-9-en-4-ol which can be epoxidized to give the monoepoxy alcohol compound under discussion.

The preparation of 10-oxapentacyclo-[6.3.1.1$^{3,6}$.0$^{2,7}$.0$^{9,11}$]tridec-4-ylmethyleneoxyalkanol,
10-oxapentacyclo[6.3.1.-$^{3,6}$.0$^{2,7}$.0$^{9,11}$]tridec-4-ylmethyleneoxy-alkane-poly-ol,
10-oxapentacyclo[6.3.1.1$^{3,6}$.0$^{2,7}$.0$^{9,11}$]tridec-4-ylalkanol, or
10-oxapentacyclo[6.3.1.1$^{3,6}$.0$^{2,7}$.0$^{9,11}$]tridec-4,5-ylene-dialkanol, also, can be prepared via the Diels-Alder synthesis route, followed by epoxidizing the Diels-Alder product. For instance, the reaction of at least two mols of cyclopentadiene with one mol of alkenol, allyl hydroxyalkyl ether, allyl polyhydroxyalkyl ether, or alkenediol will yield tetracyclo[6.2.1.1$^{3,6}$.0$^{2,7}$]dodec-9-en-4-ylalkanol,
tetracyclo[6.2.1.1$^{3,6}$.0$^{2,7}$]dodec-9-en-4-ylmethyleneoxyalkanol,
tetracyclo[6.2.1.1$^{3,6}$.0$^{2,7}$]dodec-9-en-4-ylmethyleneoxyalkane-poly-ol, or
tetracyclo[6.2.1.1$^{3,6}$.0$^{2,7}$]dodec-9-en-4,5-ylene-dialkanol, respectively.

Epoxidation of these olefinically unsaturated alcohol precursors will produce the monoepoxy alcohol compounds under consideration.

The 4-oxatetracyclo[6.2.1.0$^{2,7}$.0$^{3,5}$]undec-9-oxy(mono- and polyalkyleneoxy)alkanols can be prepared by reacting one mol of tricyclo[5.2.1.0$^{2,6}$]dec-3-en-8-ol with at least two mols and upwards to 100 mols, or more, of a saturated aliphatic mono vicinal-epoxyhydrocarbon (hereinafter termed "olefin oxide"), e.g., ethylene oxide, 1,2-epoxypropane, 1,2-epoxybutane, 2,3-epoxybutane, styrene oxide, 1,2-epoxyoctane, 1,2-epoxydodecane, 1,2-epoxyoctadecane, 1-phenyl-2,3-epoxybutane, 1-cyclohexyl-2,3-epoxypentane, and the like; in the presence of an alkali metal hydroxide catalyst, e.g., about 0.1 weight percent potassium hydroxide, based on the total weight of the reactants; under essentially anhydrous conditions; and at an elevated temperature, e.g., from about 90° C., and lower, to about 140° C., and higher. If desired, the reaction product mixture can be purified by washing with water or an aqueous acetic acid solution to remove or neutralize the residual catalyst. The resulting product, i.e., tricyclo[5.2.1.0$^{2,6}$]dec-3-en-8-oxy(mono- or polyalkyleneoxy)alkanol, then can be reacted with an epoxidizing agent to yield the monoepoxy alcohol compound. The following structural formula characterizes the 4-oxatetracyclo[6.2.1.0$^{2,7}$.0$^{3,5}$]undec-9-oxy(mono- and polyalkyleneoxy)alkanols:

VI

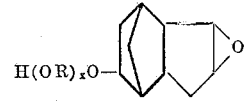

wherein $x$ is a number having an average value of at least 2 (and upwards to 100, and greater), and wherein R is a divalent saturated aliphatic hydrocarbon radical. It is to be noted that $x$ has an average value since the epoxy alcohol product which results from the reaction is not composed of discrete, identical molecules, but rather, the product is composed of molecules in which the value for $x$ can vary over a broad range.

The 4-oxatetracyclo[6.2.1.0$^{2,7}$.0$^{3,5}$]undec-9,10-ylene-di-[oxy(mono- and polyalkyleneoxy)alkanols] can be prepared by reacting one mol of tricyclo[5.2.1.0$^{2,6}$]dec-3-ene-8,9-diol with at least 4 mols of an olefin oxide, followed by epoxidation, in the manner explained supra. These monoepoxy alcohols can be characterized as follows:

VII

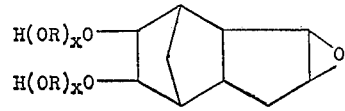

wherein each $x$, individually, is a number having an average value of at least 2 (and upwards to 100 and greater) and wherein R is a divalent saturated aliphatic hydrocarbon radical.

The 4-oxatetracyclo[6.2.1.0$^{2,7}$.0$^{3,5}$]undec-10,11-ylene-di[oxy(mono- and polyalkyleneoxy)alkanols] can be prepared by the reaction of one mol of tricyclo-[5.2.1.0$^{2,6}$]dec-3-ene-9,10-diol with at least 4 mols of an olefin oxide, followed by epoxidation, in the manner explained supra. These monoepoxy alcohols have the following structural formula:

VIII

wherein $x$ and R have the values set forth in Formula VII supra.

The 10 - oxapentacyclo[6.3.1.1$^{3,6}$.0$^{2,7}$.0$^{9,11}$]tridec-4-oxy-(mono- and polyalkyleneoxy)alkanols are prepared by reacting one mol of tetracyclo[6.2.1.1$^{3,6}$.0$^{2,7}$]dodec-9-en-4-ol with at least 2 mols of an olefin oxide, followed by epoxidation, in the manner explained supra. These monoepoxy alcohols are characterized by the following structural formula:

IX

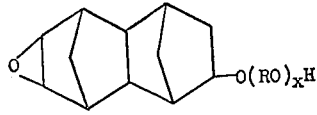

wherein $x$ and R have the values set forth in Formula VII supra.

The 10 - oxapentacyclo[6.3.1.1$^{3,6}$.0$^{2,7}$.0$^{9,11}$]tridec - 4,5-ylene-di[oxy(mono- and polyalkyleneoxy)alkanols] are prepared by the reaction of at least 4 mols of an olefin oxide per mol of tetracyclo[6.2.1.1$^{3,6}$.0$^{2,7}$]dodec-9-ene-4,5-diol, followed by epoxidation, in the manner explained supra. The resulting monoepoxy alcohols are thusly characterized:

X

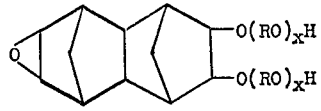

wherein $x$ and R have the values set forth in Formula VII supra.

The 10 - oxapentacyclo[6.3.1.1$^{3,6}$.0$^{2,7}$.0$^{9,11}$]tridec-4-yl-alkyleneoxyalkanols can be prepared by the reation of equimolar quantities of tetracyclo[6.2.1.1$^{3,6}$.0$^{2,7}$]dodec-9-en-4-ylalkanol and an olefin oxide, followed by epoxidation, in the manner explained supra. These monoepoxy alcohols have the following formula:

XI

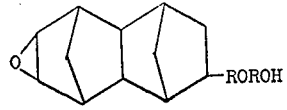

wherein each R can be the same or different divalent saturated aliphatic hydrocarbon radicals.

The 10 - oxapentacyclo[6.3.1.1$^{3,6}$.0$^{2,7}$.0$^{9,11}$]tridec-4-yl-alkyleneoxy (mono- and polyalkyleneoxy)alkanol can be prepared by the reaction of at least 2 mols of an olefin oxide per mol of tetracyclo[6.2.1.1$^{3,6}$.0$^{2,7}$]dodec-9-en-4-yl-alkanol, then epoxidizing, in the manner explained supra. The following structural formula illustrates these monoepoxy alcohol compounds:

XII

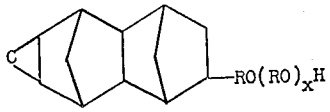

wherein each R, individually, is a divalent saturated aliphatic hydrocarbon radical, and wherein $x$ is a number having an average value of at least 2.

The 10 - oxapentacyclo[6.3.1.1$^{3,6}$.0$^{2,7}$.0$^{9,11}$]tridec - 4,5-ylene-di(alkyleneoxyalkanols) are obtained by reacting two mols of an olefin oxide per mol of tetracyclo-[6.2.1.1$^{3,6}$.0$^{2,7}$]dodec-9-en-4,5-ylene - dialkanol, followed by epoxidation, in the manner explained supra. The following formula characterizes the monoepoxy alcohols under consideration:

XIII

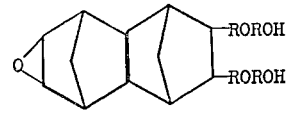

wherein each R can be the same or different divalent saturated aliphatic hydrocarbon radicals.

The 10 - oxapentacyclo[6.3.1.1$^{3,6}$.0$^{2,7}$.0$^{9,11}$]tridec - 4,5-ylene-di[alkyleneoxy(mono- and polyalkyleneoxy)alkanols] are prepared by the reaction of at least 4 mols of an olefin oxide per mol of tetracyclo[6.2.1.1$^{3,6}$.0$^{2,7}$]dodec-9-en-4,5-ylene-dialkanol, followed by expodiation, in the manner explained supra. The following structural formula illustrates the monoepoxy alcohols under discussion:

XIV

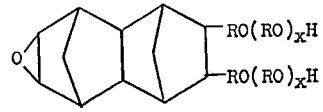

wherein each R, individually, is a divalent saturated aliphatic hydrocarbon radical, and wherein $x$ is a number having an average value of at least 2.

It is to be understood that the oxymethyleneoxyradical, i.e., —OCH$_2$O—, is not encompassed within the scope of the monoepoxy alcohol compounds which are employed in the preparation of the novel polyhydric polymers.

The monoepoxy alcohol compounds can be prepared by the reaction of the corresponding olefinically unsaturated alcohol precursor with an epoxidizing agent. Among the epoxidizing agents contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, peroctanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight percent of peracetic acid, based on the total weight of peracid and inert organic vehicle is suitable; from about 20 to 40 weight percent of peracid is preferred. The epoxidation reaction can be conducted at a temperature in the range of from about 0° C., and lower, to about 100° C., and higher, and preferably, from about 20° to about 80° C. Theoretically, to effect complete epoxidation of the olefinically unsaturated alcohol precursor equimolar quantities of peracid and precursor should be employed. However, since some degradation of the peracid occurs during the epoxidation reaction, it is desirable to employ a quantity of peracid in excess of that theoretically required to effect essentially complete epoxidation of said precursor, e.g., from about 1.1 to about 10, and higher, mols of peracid per mole of precursor. The epoxidation reaction is conducted for a period of time sufficient to introduce oxirane oxygen at the site of the carbon to carbon double bond present in the precursor, e.g., from several minutes to several hours. Periodic analysis of samples of the reaction mixture to determine the quantity of peracid consumed during the epoxidation reaction can be readily performed by the operator by well established techniques and procedures. At the termination of the epoxidation reaction, any unreacted olefinic precursor, acid by-product, inert vehicle, if employed, and the like, can be recovered from the reaction product mixture, for example, by distillation under reduced pressure. Further well known purification techniques can be employed, as desired.

Various modifications and embodiments of the invention(s) also are contemplated. For instance, the monoepoxy alcohol compound can be reacted with a polyepoxide, e.g., dicyclopentadiene dioxide, 4-vinylcyclohexene dioxide, bis(2,3-epoxycyclopentyl) ether, 6-methyl-3,4 - epoxycyclohexylmethyl 6-methyl-3,4-epoxycyclohexanecarboxylate, and the like, under the operative conditions noted previously, to produce relatively high molecular weight and/or cross-linked polymeric products. The degree or extent of cross-linking and ultimate molecular weight of these polymeric products would depend, to a considerable degree, on the quantity of polyepoxide employed and the curing conditions. The amount of polyepoxide employed can range from 1.0 to 99 weight percent, based on the total charge.

The novel polyhydric polymeric products described in this specification also can be reacted with polyepoxides such as those illustrated above, to produce hard, solid, infusible, resinous products which have utility in the coating, laminating, molding, and/or encapsulating arts.

Fillers and pigments can be added to the novel esterification products (varnishes) to produce special effects such as coloration, inhibition of corrosion, semigloss, gloss, decoration, increased hardness, and the like. The technology of fillers and pigment and their effects are well known in the art. Examples of pigments are chrome green, chrome yellow, iron oxides, silica, talc, titanium dioxide, zinc oxide, white lead, litharge, and the like.

The following examples are illustrative.

The term "acid number" is defined as the number of milligrams of potassium hydroxide which are required to neutralize the free acid in a gram of substance. In the following experimental examples, the "acid numbers" were determined by dissolving the sample for analysis in a solvent such as xylene and titrating with a standard alcoholic potassium hydroxide solution using phenolphthalein as the indicator. When a solvent was present with the reaction mixture being analyzed, the acid numbers were calculated for the solid, reactive component.

After the polymerizations were completed the viscosities of the products were determined at room temperature using a Brookefield viscometer, Model LVF. Total solids present in the polymer solution were determined by weighing about a one-gram sample of the solution into an aluminum weighing dish measuring about two inches in diameter, heating the open dish in a mechanically convected oven at 160° C. for about 15 minutes, and after cooling to room temperature, the remaining residue was weighed.

The evaluation of the various polymers as baked protective coatings generally involved the following:

(1) The adjustment of the solution viscosity, by the addition of xylene, to allow the preparation of films having a thickness of from 0.7 to 1.8 mils (thousandths of an inch).

(2) Cobalt octoate, 0.01 weight percent as cobalt, was then added to serve as a drier.

(3) Films were applied by dipping Parkerized steel panels with a Fischer-Payne Dip-Coater.

(4) The resulting coated panels were air dried for 15 to 30 minutes and subsequently baked for 30 minutes at 350° F.

(5) A coating was also applied to a glass plate to be used for obtaining Sward hardness values. Baked film thickness range from 0.8 to 2.2 mils.

(6) The resulting coatings were then tested for flexibility with a Parlin-du Pont Impact Tester, results reported as in lbs.

(7) Coated panels were tested in boiling water for one hour. The following ratings were used: Excellent—unaffected except for a slight loss of gloss at the air-water interface; good—some softening at the air-water interface; fair—definitely tacky at air-water interface.

(8) Coated panels were tested for caustic resistance by immersion in 20 percent sodium hydroxide for 24 hours at room temperature. The following ratings were used: Excellent—no change; good—very slight softening; fair—in addition to softening, some loss of gloss and adhesion was observed; poor—film was dissolved.

(9) Acid resistance was determined by applying a one weight percent sulfuric acid solution in water to the film used for Sward hardness determination. The test area or spot was covered with a two-inch watch glass filled with the acid solution and allowed to stand for 24 hours.

EXAMPLE 1

The compound, tricyclo[5.2.1.0$^{2,6}$]dec - 3 - en - 8 - oxyethanol, was prepared by the reaction of ethylene glycol with tricyclo[5.2.1.0$^{2,6}$]deca-3,8-diene in the presence of boron trifluoride catalyst. To 833 grams (4.29 mols) of tricyclo[5.2.1.0$^{2,6}$]dec - 3 - en-8-oxyethanol maintained at about 40° C., there was added, dropwise, over a period of 3 hours, with stirring, 1,340 grams of a 26.8 weight percent solution of peracetic acid in ethyl acetate. The reaction was exothermic and consequently, the reaction vessel was occasionally cooled with ice. The resulting admixture was maintained at about 40° C. for an additional 3 hours plus standing overnight at room temperature, i.e., about 24° C. for about 15 hours. Analysis of the reaction product mixture indicated that the theoretical amount of peracid had been consumed. Subsequently, the reaction product mixture was diluted with ethylbenzene, and the volatiles, e.g., ethyl acetate, acetic acid by-product, etc., were removed therefrom by distillation under reduced pressure. There was obtained (via fractional distillation) 869 grams of a colorless liquid, i.e., 4-oxatetracyclo-[6.2.1.0$^{2,7}$.0$^{3,5}$]undec-9-oxyethanol, which had the following properties:

Boiling point _____ 134°–135° C./0.35 mm. of Hg.
$n_D^{30}$ _____ 1.5095.

*Elemental analysis.*—Calculated: Carbon, 68.54%; hydrogen, 8.63%. Found: Carbon, 68.44%; hydrogen, 8.56%.

The yield was 96 percent.

EXAMPLE 2

The compound, tricyclo[5.2.1.0$^{2,6}$]dec - 3 - en-8-ol, was prepared by the reaction of tricyclo[5.2.1.0$^{2,6}$]deca - 3,8-diene in the presence of an aqueous solution of sulfuric acid under the influence of heat. To 150 grams (1 mol) of tricyclo[5.2.1.0$^{2,6}$]dec - 3 - en-8-ol maintained at about 45°–50° C., there was added, dropwise, over a period of 55 minutes, with stirring, 308 grams of a 27.2 weight percent solution of peracetic acid in ethyl acetate. The resulting admixture then was maintained at about 45°–50° C. for an additional 2.25 hours. Analysis of the reaction product mixture indicated that the theoretical amount of peracid had been consumed. Subsequently, the reaction product mixture was diluted with ethylbenzene, and the volatiles, e.g., ethyl acetate, acetic acid by-product, etc., were removed therefrom by distillation under reduced pressure. There was obtained (via fractional distillation) 164 grams of a colorless liquid, i.e., 4-oxatetracyclo-[6.2.1.0$^{2,7}$.0$^{3,5}$]undecan - 9 - ol which had the following properties.

Boiling point _____ 130°–134° C./2.5 mm. of Hg.
$n_D^{30}$ _____ 1.5205.
Analysis for epoxide ____ 96.9 percent.

EXAMPLE 3

The compound, tetracyclo[6.2.1.1$^{3,6}$.0$^{2,7}$]dodec-9-en-4-ol (melting point of 87°–88° C.), is prepared by saponification of the reaction product obtained by the Diels-Alder synthesis of cyclopentadiene and vinyl acetate. To 176 grams of tetracyclo[6.2.1.1$^{3,6}$.0$^{2,7}$]dodec-9-en-4-ol, there is added 0.2 gram of potassium hydroxide, followed by heating the resulting admixture to about 100°–120° C. with stirring. Ethylene oxide is fed into the stirred reaction mixture (below the liquid level) until the weight thereof increases by 44 grams. Then the resulting reaction product mixture is cooled, followed by neutralizing the catalyst with acetic acid. The reaction product mixture is washed twice with aqueous solution of sodium chloride, and then washed with water. The product, tetracyclo[6.2.1.1$^{3,6}$.0$^{2,7}$]dodec-9-en-4-oxyethanol, is dried at an elevated temperature under reduced pressure.

EXAMPLE 4

To a mixture of 200 grams of tetracyclo[6.2.1.1$^{3,6}$.0$^{2,7}$]dodec-9-en-4-oxyethanol and 100 grams of ethyl acetate, there is added under stirring, dropwise 278 grams of a 27.4 weight percent solution of peracetic acid in ethyl acetate. The reaction is exothermic and consequently, the reaction temperature is controlled at about 45° C. by the rate of addition. After 2.5 hours at this temperature, the preaction is essentially complete. The volatiles, acetic acid by-product, ethyl acetate, etc., are removed by co-distillation with ethylbenzene under reduced pressure. After stripping under high vacuum at about 100° C., there is obtained a yellow, viscous liquid product, i.e., 10 - oxapentacyclo[6.3.1.1$^{3,6}$.0$^{2,7}$.0$^{9,11}$]tridec - 4-oxyethanol. The infrared spectrum discloses the presence of epoxide and hydroxyl groups.

EXAMPLE 5

The compound, tetracyclo[6.2.1.1$^{3,6}$.0$^{2,7}$]dodec-9-en-4-ylmethanol (boiling point of 100° C. at 0.5 mm. of Hg, and $n_D^{30}$ of 1.5362), is prepared via the Diels-Alder synthesis of cyclopentadiene and allyl alcohol. To 190 grams of tetracyclo[6.2.1.1$^{3,6}$.0$^{2,7}$]dodec-9-en-4 - ylmethanol, there is added 0.2 gram of potassium hydroxide, followed by heating the resulting admixtures to about 115°–130° C. with stirring. Ethylene oxide is fed into the stirred reaction mixture through a diffuser (below the liquid level) until the weight thereof increases by 43 grams. Then the resulting reaction product mixture is cooled, washed twice with ice water, and dried by heating to about 110° C. under a reduced pressure of 2 mm. of Hg. The resulting product, i.e., tetracyclo[6.2.1.1$^{3,6}$.0$^{2,7}$]dodec - 9 - en-4-ylmethyleneoxyethanol, is employed in Example 6 to follow.

EXAMPLE 6

To a mixture of 210 grams of tetracyclo[6.2.1.1$^{3,6}$.0$^{2,7}$]dodec-9-en-4-ylmethyleneoxyethanol and 100 grams of ethyl acetate, there is added under stirring, dropwise, 330 grams of a 23 weight percent solution of peracetic acid in ethyl acetate. The reaction is exothermic and consequently, the reaction temperature is controlled to about 40–50° C. by the rate of addition during the initial stage, and by mild heating in the latter stage. After 3 hours at this temperature, the reaction is essentially complete. The volatiles, acetic acid by-product, ethyl acetate, etc., are removed by co-distillation with ethyl benzene under reduced pressure. After stripping under high vacuum at about 110° C., there is obtained a yellow, viscous liquid product. The product, 10-oxapentacyclo[6.3.1.1$^{3,6}$.0$^{2,7}$.0$^{9,11}$]tridec - 4 - ylmethyleneoxyethanol, is identified by its infrared secptrum.

EXAMPLE 7

(A) Tricyclo[5.2.1.0$^{2,6}$]dec-3-ene-9,10 - diol (melting point of 90° C.) is prepared by the saponification of the reaction product of dicyclopentadiene and lead tetraacetate. To a recation vessel which contains 42 grams of the above said diol admixture and 42 grams of ethyl acetate maintained with stirring at about 30° C., there is added, dropwise, over a period of one hour 76 grams of a 26.5 weight percent solution of peracetic acid in ethyl acetate. The resulting solution is maintained at 30° C. for an additional 5 hours. The reaction is essentially complete as indicated by titration for peracetic acid. The volatile materials, i.e., ethyl acetate, acetic acid by-product, etc., are removed by co-distillation with ethylbenzene. The residue product, thus obtained, solidifies on standing and comprises 4-oxatetracyclo[6.2.1.0$^{2,7}$.0$^{3,5}$]undecane-10,11-diol.

(B) In an analogous manner as above, tricyclo[5.2.1.0$^{2,6}$]undec-3-ene-8,9-diol (which is prepared by the reaction of equimolar quantities of dicyclopentadiene and hydrogen peroxide in the presence of osmium tetraoxide) is reacted with a solution of peracetic acid in ethyl acetate, to yield 4 - oxatetracyclo[6.2.1.0$^{2,7}$.0$^{3,5}$]undecane-9,10-diol.

EXAMPLE 8

To a reaction vessel which contains 45 grams of ethyl acetate and 44 grams of tetracyclo[6.2.1.1$^{3,6}$.0$^{2,7}$]dodec-9-en-4,5-ylene-dimethanol (a white solid which is isolated from high boiling fractions, i.e., 140°–180° C./0.5 mm. of Hg, resulting from the Diels-Alder synethsis of cyclopentadiene and 2-butene-1,4-diol), maintained at about 30° C. with stirring, there is added, dropwise, over a period of one hour 42 grams of a 26 weight percent solution of peracetic acid in ethyl acetate. The resulting solution is maintained at 30° C. for an additional 5.5 hours to ensure completion of the reaction. The volatile materials, i.e., ethyl acetate, acetic acid by-product, etc., are removed by co-distillation with ethylbenzene. The residue product, thus obtained, solidifies on standing and is identified as 10-oxapentacyclo[6.3.1.1$^{3,6}$.0$^{2,7}$.0$^{9,11}$]tridec-4,5-ylene-dimethanol by its infared absorption spectrum.

EXAMPLE 9

To a recation vessel which contains 40 grams of ethyl acetate and 40 grams of tetracyclo[6.2.1.1$^{3,6}$.0$^{2,7}$]dodec-9-ene-4,5-diol (which is prepared by the reaction of equimolar quantities of tetracyclo[6.2.1.1$^{3,6}$.0$^{2,7}$]dodeca-4,9-diene and hydrogen peroxide in the presence of osmium tetroxide) maintained at about 30° C. with stirring, there is added, dropwise, over a period of 1.5 hours 42 grams of a 26 weight percent solution of peracetic acid in ethyl acetate. The resulting solution is maintained at 30° C. for an additional 6 hours. At the end of this period of time the reaction is essentially complete as indicated by titration for peracetic acid. The volatile materials, i.e., ethyl acetate, acetic acid by-product, etc., are removed by co-distillation with ethylbenzene. The solid residue product, thus obtained, is identified as 10 - oxapentacyclo[6.3.1.1$^{3,6}$.0$^{2,7}$.0$^{9,11}$]tridecane-4,5-diol by its infrared absorption spectrum.

EXAMPLE 10

To 62 grams of tetracyclo[6.2.1$^{3,6}$.0$^{2,7}$]dodec-9-en-4-ol (melting point of 87°–88° C.; prepared by the saponification of the reaction product obtained by the Diels-Alder synthesis of cyclopentadiene and vinyl acetate) and 24 grams of ethyl acetate, maintained at about 50°–55° C., there was added to the resulting solution, dropwise, 120 grams of a 28.6 weight percent solution of peracetic acid in ethyl acetate over a period of 35 minutes. After an additional 2 hours at about 50°–55° C., the amount of peracetic acid consumed was 97.7% of the theoretical. The volatiles were removed from the reaction product mixture by co-distillation with ethylbenzene. There was obtained 77 grams of a viscous liquid product identified as 10-oxapentacyclo[6.3.1.1$^{3,6}$.0$^{2,7}$.0$^{9,11}$]tridecan-4-ol.

EXAMPLE 11

To 150 grams of tetracyclo[6.2.1.1$^{3,6}$.0$^{2,7}$]dodec-9-en-4-ylmethanol (boiling point of 100° C./0.5 mm. of Hg and $n_D^{30}$ of 1.5362; prepared by the Diels-Alder synthesis of cyclopentadiene and allyl alcohol) which was maintained with stirring at about 50°–55° C., there was added, dropwise, 232 grams of a 28.6 weight percent solution of peracetic acid in ethyl acetate over a period of 70 minutes. After an additional one hour at about 50°–55° C., the amount of peracetic acid consumed was 98.5 percent of the theoretical. The volatiles were removed from the reaction product mixture by co-distillation with ethylbenzene. There was obtained 177 grams of a viscous product containing 10-oxapentacyclo-[6.3.1.1$^{3,6}$.0$^{2,7}$.0$^{9,11}$]tridec-4-ylmethanol.

EXAMPLE 12

To a reaction vessel which contains 112 grams of tricyclo[5.2.1.0$^{2,6}$]dec-3-en-8-oxypropanediol (boiling point of 175°–180° C. and $n_D^{25}$ of 1.5186; prepared by the boron trifluoride-catalyzed addition of glycerol to dicyclopentadiene under the influence of heat), maintained at about 30° C. with stirring, there is added, dropwise, 168 grams of a 25 weight percent solution of peracetic acid in ethyl acetate over a period of about 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product by co-distillation with ethylbenzene. The viscous liquid product, thus obtained, is identified as 4-oxatetracyclo[6.2.1.0$^{2,7}$.0$^{3,5}$]undec - 9 - oxypropanediol (or glycerol mono-4-oxatetracyclo[6.2.1.0$^{2,7}$.0$^{3,5}$]undec-9-enyl ether) by inspection of its infrared absorption spectrum.

EXAMPLE 13

To a reaction vessel which contains 800 grams of tricyclo[5.2.1.0$^{2,6}$]dec-3-en-8-oxy-n-butanol (which results from the boron trifluoride catalyzed addition of 1,4-butanediol to tricyclo[5.2.1.0$^{2,6}$]deca-3,8-diene under the influence of heat), maintained at about 30° C. with stirring, there is added, dropwise, 1550 grams of a 26.2 weight percent solution of peracetic acid in ethyl acetate over a period of 4 hours. After an additional 6 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 4-oxatetracyclo-[6.2.1.0$^{2,6}$.0$^{3,5}$]undec-9-oxy-n-butanol by inspection of its infrared absorption spectrum.

EXAMPLE 14

To a reaction vessel which contains 100 grams of ethyl acetate and 125 grams pentaerythritol mono-tricyclo-[5.2.1.0$^{2,6}$]dec-3-en-8-yl ether (which results from the boron trifluoride-catalyzed addition of pentaerythritol to tricyclo[5.2.1.0$^{2,6}$]deca-3,8-diene under the influence of heat), maintained at about 30° C. with stirring, there is added, dropwise, 168 grams of a 25 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as pentaerythritol mono-4-oxatetracyclo-[6.2.1.0$^{2,7}$.0$^{3,5}$]undec-9-yl ether by inspection of its infrared absorption spectrum and analysis for the epoxide group.

EXAMPLE 15

To a reaction vessel which contains 76 grams of hexanetriol mono - tetracyclo[6.2.1.1$^{3,6}$.0$^{2,7}$]dodec-9-en-4-yl ether (which results from the boron trifluoride catalyzed addition of 1,2,6-hexanetriol to tetracyclo[6.2.1.1$^{3,6}$.0$^{2,7}$]dodeca-4,9-diene under the influence of heat), maintained at about 30° C. with stirring, there is added, dropwise, 84 grams of a 25 weight percent solution of peracetic acid in ethyl acetate over a period of 1.5 hours. After an additional 6 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as hexanetriol mono-10-oxapentacyclo[6.3.1.1$^{3,6}$.0$^{2,7}$.0$^{9,11}$]tridec-4-yl ether by inspection of its infrared absorption spectrum.

EXAMPLE 16

To a reaction vessel which contains 120 grams of glycerol mono - tetracyclo[6.2.1.1$^{3,6}$.0$^{2,7}$]doec-9-en-4-yl ether (which results from the boron trifluoride catalyzed addition of glycerol to tetracyclo[6.2.1.1$^{3,6}$.0$^{2,7}$]dodeca-4,9-diene under the influence of heat), maintained at about 30° C. with stirring, there is added, dropwise, 165 grams of a 25.5 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained is identified as glycerol mono - 10 - oxapentacyclo[6.3.1.1$^{3,6}$.0$^{2,7}$.0$^{9,11}$]tridec-4-yl ether by inspection of its infrared absorption spectrum.

EXAMPLE 17

(A) To a reaction vessel which contains 66 grams of glycerol mono-tetracyclo[6.2.1.1$^{3,6}$.0$^{2,7}$]dodec - 9 - en - 4 - ylmethyl ether (which results from the Diels-Alder synthesis of 2 mols of cyclopentadiene with one mole of glycerol monoallyl ether), maintained at about 30° C. with stirring, there is added, dropwise, 80 grams of a 24.8 weight percent solution of peracetic acid in ethyl acetate over a period of 2 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as glycerol mono - 10 - oxapentacyclo[6.3.1.1$^{3,6}$.0$^{2,7}$.0$^{9,22}$]tridec - 4 - ylmethyl ether by inspection of its infrared absorption spectrum.

(B) In an analogous manner as above, pentaerythritol mono-tetracyclo[6.2.1.1$^{3,6}$.0$^{2,7}$]dodec - 9 - en - 4-ylmethyl ether (prepared from the Diels-Alder synthesis of 2 mols of cyclopentadiene with one mole of pentaerythritol monoallyl ether) is reacted with a solution of peracetic acid in ethyl acetate to give a viscous liquid product which is identified as pentaerythritol mono-10-oxapentacyclo[6.3.1.1$^{3,6}$.0$^{2,7}$.0$^{9,11}$]tridec-4-ylmethyl ether by its infrared absorption spectrum.

EXAMPLE 18

To a reaction vessel which contains 140 grams of tetracyclo[6.2.1.1$^{3,6}$·0$^{2,7}$]dodec-9-en-4-ylethanol (which results from the Diels-Alder synthesis of 2 mols of cyclopentadiene and one mol of 1-buten-4-ol), maintained at about 50° C. with stirring, there is added, dropwise, 260 grams of a 25.5 weight percent solution of peracetic acid in ethyl acetate over a period of 2 hours. After an additional 6 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[6.3.1.1$^{3,6}$.0$^{2,7}$.0$^{9,11}$]tridec - 4 - ylethanol by inspection of its infrared absorption spectrum.

EXAMPLE 19

The compound, tetracyclo[6.2.1.1$^{3,6}$.0$^{2,7}$]dodec-9-en-4- ol (melting point of 87°–88° C.), is prepared by the saponification of the reaction product obtained by the Diels-Alder synthesis of 2 mols of cyclopentadiene with one mol of vinyl acetate. To 88 grams of tetracyclo-[6.2.1.1$^{3,6}$.0$^{2,7}$]dodec-9-en-4-ol, there is added 0.2 gram of potassium hydroxide, followed by heating the resulting admixture to about 100°–120° C. with stirring. Eethylene oxide is fed into the stirred reaction mixture (below the liquid level) until the weight thereof increases by 176 grams. Then the resulting reaction product mixture is cooled, followed by neutralizing the catalyst with acetic acid. The reaction product mixture is washed with aqueous solution of sodium chloride, and then washed with water. The product, a mixture of tetracyclo[6.2.1.1$^{3,6}$.0$^{2,7}$]dodec - 9 - en - 4 - oxy(polyethyleneoxy)ethanols, is dried at an elevated temperature under reduced pressure.

EXAMPLE 20

To a reaction vessel which contains 200 grams of ethyl acetate and 200 grams of the mixture of tetracyclo-[6.2.1.1$^{3,6}$.0$^{2,7}$]dodec - 9 - en - 4 - oxy(polyethyleneoxy)-ethanols which is prepared as explained in Example 19 supra and maintained at about 30° C. with stirring, there is added, dropwise, 350 grams of a 26.2 weight percent solution of peracetic acid in ethyl acetate over a period of 2 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained is identified as a mixture of 10-oxapentacyclo-[6.3.1.1$^{3,6}$.0$^{2,7}$.0$^{9,11}$]tridec-4-oxy(polyethyleneoxy)ethanols

EXAMPLE 21

To a reaction vessel which contains 160 grams of tricyclo[5.2.1.0$^{3,6}$.0$^{2,7}$.0$^{9,11}$]dec-3-en-8-ol, there is added 0.2 gram of potassium hydroxide, followed by heating the resulting admixture to about 120° C. with stirring. Eethylene oxide is fed into the stirred reaction mixture (below the liquid level) until the weight thereof increases by 240 grams. Then the resulting reaction product mixture is cooled, followed by neutralizing the catalyst with acetic acid. The reaction product mixture is washed with aqueous solution of sodium chloride, and then washed with water. The product, a mixture of tricyclo-[5.2.1.0$^{2,6}$]dec - 3 - en - 8 - oxy(polyethyleneoxy)ethanols, is dried at an elevated temperature under reduced pressure.

EXAMPLE 22

To a reaction vessel which contains 250 grams of ethyl acetate and 300 grams of the mixture of tricyclo-[5.2.1.0$^{2,6}$]dec - 3 - en - oxy(polyethyleneoxy)ethanols which is prepared as explained in Example 21 supra and maintained at about 40° C. with stirring, there is added, dropwise, 600 grams of a 25.6 weight percent solution of peracetic acid in ethyl acetate over a period of 3 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The very viscous liquid product thus obtained is identified as a mixture of 4-oxatetracyclo-

[6.2.1.0$^{2,6}$.0$^{3,5}$]undec-9-oxy(polyethyleneoxy)ethanols by inspection of its infrared absorption spectrum.

EXAMPLE 23

To a reaction vessel which contains 80 grams of tricyclo[5.2.1.0$^{2,6}$]dec-3-ene-8,9-diol, there is added 0.3 gram of potassium hydroxide, followed by heating the resulting admixture to about 120° C. with stirring. Ethylene oxide is fed into the stirred reaction mixture (below the liquid level) until the weight thereof increases by 330 grams. Then the resulting reaction product mixture is cooled, followed by neutralizing the catalyst with acetic acid. The reaction product mixture is washed twice with aqueous solution of sodium chloride, and then washed with water. The product, a mixture of tricyclo-[5.2.1.0$^{2,6}$]dec - 3 - en - 8,9 - ylene-di[oxy(polyethyleneoxy)ethanols], is dried at an elevated temperature under reduced pressure.

EXAMPLE 24

To a reaction vessel which contains 110 grams of ethyl acetate and 110 grams of the mixture of tricyclo [5.2.1.0$^{2,6}$]dec - 3 - en-8,9-ylene-di[oxy(polyethyleneoxy)ethanols] which is prepared as explained in Example 23 supra and maintained at about 40° C. with stirring, there is added, dropwise, 400 grams of a 26.2 weight percent solution of peracetic acid in ethyl acetate over a period of 2.5 hours. After an additional 6 hours at about 40° C., the reaction is essentially complete as indicated by a titration for peracetic acid. The volatile materials, i.e., ethyl acetate, acetic acid by-product, etc., are removed from the reaction product mixture by co-distillation with ethylbenzene. The very viscous liquid product, thus obtained, is identified as a mixture of 4-oxatetracyclo [6.2.1.0$^{2,6}$.0$^{3,5}$]undec - 9,10 - ylene-di[oxy(polyethyleneoxy)ethanols] by inspection of its infrared absorption spectrum.

EXAMPLE 25

To a reaction vessel which contains 50 grams of tetracyclo[6.2.1.1$^{3,6}$.0$^{2,7}$]dodec-9-ene-4,5-diol, there is added 0.2 gram of potassium hydroxide, followed by heating the resulting admixture to about 100°–120° C. with stirring. Ethylene oxide is fed into the stirred reaction mixture (below the liquid level) until the weight thereof increases by 280 grams. Then the resulting reaction product mixture is cooled, followed by neutralizing the catalyst with acetic acid. The reaction product mixture is washed twice with aqueous solution of sodium chloride, and then washed with water. The product, a mixture of tetracyclo[6.2.1.1$^{3,6}$.0$^{2,7}$]dodec - 9 - en-4,5-ylene-di[oxy(polyethyleneoxy)ethanols], is dried at an elevated temperature under reduced pressure.

EXAMPLE 26

To a reaction vessel which contains 80 grams of ethyl acetate and 80 grams of the mixture of tetracyclo [6.2.1.1$^{3,6}$.0$^{2,7}$]-dodec-9 - en - 4,5-ylene-di[oxy(polyethyleneoxy)ethanols] which is prepared as explained in Example 25 as supra and maintained at about 45° C. with stirring, there is added, dropwise, 300 grams of a 26.7 weight percent solution of peracetic acid in ethyl acetate over a period of 2 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as a mixture of 10-oxapentacyclo[6.3.1.1$^{3,6}$.0$^{2,7}$.0$^{9,11}$]tridec - 4,5 - ylene - di[oxy(polyethyleneoxy)ethanols] by inspection of its infrared absorption spectrum.

EXAMPLE 27

To 110 grams of the compound, tetracyclo[6.2.1.1$^{3,6}$.0$^{2,7}$]dodec-9-en-4,5-ylene-dimethanol (prepared via the Diels-Alder synthesis of 2 mols of cyclopentadiene with one mol of 2-butene-1,4-diol), there is added 0.2 gram of potassium hydroxide, followed by heating the resulting admixture to about 100°–120° C. with stirring. Ethylene oxide is fed into the stirred reaction mixture (below the liquid level) until the weight thereof increases by 44 grams. Then the resulting reaction product mixture is cooled, followed by neutralizing the catalyst with acetic acid. The reaction product mixture is washed twice with aqueous solution of sodium chloride, and then washed with water. The product, tetracyclo[6.2.1.1$^{3,6}$.0$^{2,7}$]dodec - 9 - en-4,5-ylene-di(methyleneoxyethanol), is dried at an elevated temperature under reduced pressure.

EXAMPLE 28

To a reaction vessel which contains 70 grams of tetracyclo[6.2.1.1$^{3,6}$.0$^{2,7}$]dodec - 9 - en - 4,5-ylene-di(methyleneoxyethanol) maintained at about 30° C. with stirring, there is added, dropwise, 300 grams of a 25.6 weight percent solution of peracetic acid in ethyl acetate over a period of 3 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[6.3.1.1$^{3,6}$.0$^{2,7}$.0$^{9,11}$]tridec-4,5-ylene-di (methyleneoxyethanol)

by inspection of its infrared absorption spectrum.

EXAMPLE 29

To a reaction vessel which contains 80 grams of tricyclo[5.2.1.0$^{2,6}$]dec-3-en-8,9-ylene-di(oxyethanol) (prepared by heating 0.5 mol of tricyclo[5.2.1.0$^{2,6}$]dec-3-ene-8,9-diol with one mol of ethylene oxide in the presence of potassium hydroxide catalyst) maintained at about 30° C. with stirring, there is added, dropwise, 150 grams of a 25 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 4-oxatetracyclo[6.2.1.0$^{2,7}$.0$^{3,5}$]undec-9,10-ylene-di-(oxyethanol)

by inspection of its infrared absorption spectrum.

EXAMPLE 30

(A) To a reaction vessel which contains 60 grams of tricyclo[5.2.1.0$^{2,6}$]dec - 3 - en-9,10-ylene-di(oxyethanol), which results from the reaction of tricyclo[5.2.1.0$^{2,6}$]dec-3-ene-9,10-diol with two mols of ethylene oxide under the influence of heat and potassium hydroxide, maintained at about 30° C. with stirring, there is added, dropwise, 80 grams of a 24.8 weight percent solution of peracetic acid in ethyl acetate over a period of 2 hours. After an additional 5 hours at about 30° C., the reaction is essentially complete as indicated by a titration for peracetic acid. The volatile materials, i.e., ethyl acetate, acetic acid by-product, etc. are removed from the reaction product mixture by co-distillation with ethylbenzene. The viscous liquid product, thus obtained, is identified as 4 - oxatetracyclo[6.2.1.0$^{2,7}$.0$^{3,5}$]undec-10,11-ylene-di(oxyethanol) by inspection of its infrared absorption spectrum.

EXAMPLE 31

(A) To a reaction vessel which contains 70 grams of tetracyclo[6.2.1.1$^{3,6}$.0$^{2,7}$]dodec - 9 - en - 4,5-ylene-di(oxyethanol), which results from the potassium hydroxide-catalyzed reaction of two mols of ethylene oxide with tetracyclo[6.2.1.1$^{3,6}$.0$^{2,7}$]dodec-9-ene-4,5-diol under the influence of heat, maintained at about 30° C. with stirring, there is added, dropwise, 80 grams of a 24.8 weight percent solution of peracetic acid in ethyl acetate over a period of 2 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[6.3.1.1$^{3,6}$.0$^{9,11}$]-tridec-4,5-ylene-di (oxyethanol)

by inspection of its infrared absorption spectrum.

EXAMPLE 32

To a reaction vessel which contains 50 grams of tetracyclo[6.2.1.1$^{3,6}$.0$^{2,7}$]dodec - 9 - en-4,5-ylene-di(methyleneoxyethanol) maintained at about 30° C. with stirring, (prepared by heating 0.5 mol of tetracyclo[6.2.1.1$^{3,6}$.0$^{2,7}$]dodec-9-en-4,5-ylene-dimethanol with one mol of ethylene oxide in the presence of potassium hydroxide catalyst) there is added, dropwise, 140 grams of 25.2 weight percent solution of peractic acid in ethyl acetate over a period of 2 hours. After an additional 4 hours at about 30° C., the reaction is essentially complete as indicated by a titration for peractic acid. The volatile materials, i.e., ethyl acetate, acetic acid by-product, etc., are removed from the reaction product mixture by co-distillation with ethylebenzene. The viscous liquid product, thus obtained, is identified as 10-oxapentacyclo[6.3.1.1$^{3,6}$.0$^{2,7}$.0$^{9,11}$]-tridec-4,5-ylene-di (methyleneoxyethanol)

by inspection of its infrared absorption spectrum.

EXAMPLE 33

To a test tube, there were added 1.0 gram of 10-oxapentacyclo[6.3.1.1$^{3,6}$.0$^{2,7}$.0$^{9,11}$]tridecan-4-ol and 0.05 gram of boron trifluoride-etherate. The resulting admixture was maintained at about 26° C. for a period of 2 hours plus an additional 2 hours at 160° C. The resulting polyhydric polymeric product, at about 24° C., was a brittle, fusible solid.

EXAMPLE 34

To a test tube, there were added 1.0 gram of 10-oxapentacyclo[6.3.1.1$^{3,6}$.0$^{2,7}$.0$^{9,11}$]tridecan-4-ol and 0.1 gram of phosphoric acid. The resulting admixture was maintained at about 26° C. for a period of 2 hours plus an additional 2 hours at 160° C. The resulting polyhydric polymeric product, at about 24° C., was a brittle, fusible solid.

EXAMPLE 35

To a test tube, there were added 1.0 gram of 10-oxapentacyclo[6.3.1.1$^{3,6}$.0$^{2,7}$.0$^{9,11}$]tridecan-4-ol and 0.05 gram of stannic chloride. The resulting admixture was maintained at about 26° C. for a period of 2 hours plus an additional 2 hours at 160° C. The resulting polyhydric polymeric product, at about 24° C., was a brittle, fusible solid.

EXAMPLE 36

To a test tube, there were added 1.0 gram of 10-oxapentacyclo[6.3.1.1$^{3,6}$.0$^{2,7}$.0$^{9,11}$]tridecan-4-ol and 0.05 gram of potassium hydroxide. The resulting admixture was maintained at about 26° C. for a period of 2 hours plus an additional 2 hours at 160° C. The resulting polyhydric polymeric product, at about 24° C. was a viscous liquid.

EXAMPLE 37

To a test tube, there were added 1.0 gram of 10-oxapentacyclo[6.3.1.1$^{3,6}$.0$^{2,7}$.0$^{9,11}$]tridecan-4-ol and 0.05 gram of zinc chloride. The resulting admixture was maintained at about 26° C. for a period of 2 hours plus an additional 2 hours at 160° C. The resulting polyhydric polymeric product, at about 24° C., was a viscous liquid.

EXAMPLE 38

To a test tube, there were added 1.0 gram of 10-oxapentacyclo[6.3.1.1$^{3,6}$.0$^{2,7}$.0$^{9,11}$]tridec - 4 - ylmethanol and 0.05 gram of boron trifluoride-etherate. The resulting admixture was maintained at about 26° C. for a period of 2 hours plus an additional 2 hours at 160° C. The resulting polyhydric polymeric product, at about 24° C., was a brittle, fusible solid.

EXAMPLE 39

To a test tube, there were added 1.0 gram of 10-oxapentacyclo[6.3.1.1$^{3,6}$.0$^{2,7}$.0$^{9,11}$]tridec - 4 - ylmethanol and 0.05 gram of potassium hydroxide. The resulting admixture was maintained at about 26° C. for a period of 2 hours plus an additional 2 hours at 160° C. The resulting polyhydric polymeric product, at about 24° C., was a viscous liquid.

EXAMPLE 40

To a test tube, there were added 1.0 gram of 10-oxapentacyclo[6.3.1.1$^{3,6}$.0$^{2,7}$.0$^{9,11}$]tridec - 4 - ylmethanol and 0.05 gram of zinc chloride. The resulting admixture was maintained at about 26° C. for a period of 2 hours plus an additional 2 hours at 160° C. The resulting polyhydric polymeric product, at about 24° C., was a soft, fusible solid.

EXAMPLE 41

To a test tube, there is charged 1.0 gram of 4-oxatetracyclo[6.2.1.0$^{2,7}$.0$^{3,5}$]undecan-9-ol and 0.05 gram of boron trifluoride-piperidine complex. The resulting admixture is maintained at about 26° C. for a period of 3 hours plus an additional 3 hours at 160° C. The resulting polyhydric polymeric product, at about 24° C., is a fusible solid.

EXAMPLE 42

To a test tube, there is charged 1.0 gram of 4-oxatetracyclo[6.2.1.0$^{2,7}$.0$^{3,5}$]undec-9-oxyethanol and 0.05 gram of boron trifluoride-1,6-hexanediamine complex. The resulting admixture is maintained at about 26° C. for a period of 3 hours plus an additional 3 hours at 160° C. The resulting polyhydric polymeric product, at about 24° C., is a fusible solid.

EXAMPLE 43

To a test tube, there is charged 1.0 gram of 4-oxatetracyclo[6.2.1.0$^{2,7}$.0$^{3,5}$]undecane-9,10-diol and 0.05 gram of boron trifluoride-piperidine complex. The resulting admixture is maintained at about 26° C. for a period of 3 hours plus an additional 3 hours at 160° C. The resulting polyhydric polymeric product, at about 24° C., is a fusible solid.

EXAMPLE 44

To a test tube, there is charged 1.0 gram of 10-oxapentacyclo[6.3.1.1$^{3,6}$.0$^{2,7}$.0$^{9,11}$]tridecane-4,5-diol and 0.05 gram of boron trifluoride-piperidine complex. The resulting admixture is maintained at about 26° C. for a period of 3 hours plus an additional 3 hours at 160° C. The resulting polyhydric polymeric product, at about 24° C., is a fusible solid.

EXAMPLE 45

To a test tube, there is charged 1.0 gram of 10-oxapentacyclo[6.3.1.1$^{3,6}$.0$^{2,7}$.0$^{9,11}$]tridec-4,5-ylene-diethanol and 0.05 gram of boron trifluoride-piperidine complex. The resulting admixture is maintained at about 26° C. for a period of 3 hours plus an additional 3 hours at 160° C. The resulting polyhydric polymeric product, at about 24° C., is a fusible solid.

EXAMPLE 46

To a test tube, there is charged 1.0 gram of 10-oxapentacyclo[6.3.1.1$^{3,6}$.0$^{2,7}$.0$^{9,11}$]tridec - 4 - ylmethyleneoxyethanol and 0.05 gram of boron trifluoride-piperidine complex. The resulting admixture is maintained at about 26° C. for a period of 3 hours plus an additional 3 hours at 160° C. The resulting polyhydric polymeric product, at about 24° C., is a fusible solid.

EXAMPLE 47

To a round-bottomed flask equipped with a reflux condenser and a nitrogen-inlet tube, there are added 40 grams of 1,2,6-hexanetriol mono-10-oxapentacyclo-[6.3.1.1$^{3,6}$.0$^{2,7}$.0$^{9,11}$]-tridec-4-yl ether, 30 grams of dioxane, and 0.7 gram of boron trifluoride-diethyl ether complex. The resulting mixture is heated to 50° to 70° C. for about 3 hours after which period of time a viscous polymeric solution is obtained. A solution containing 0.3 gram of potassium hydroxide and 2.0 grams of water is added to said polymeric solution to thus neutralize the catalyst therein. To this admixture, there is added 30 grams of dehydrated castor oil acid and 30 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 48

To a round-bottomed flask equipped with a reflux condenser and a nitrogen-inlet tube, there are added 75 grams of glycerol mono-10-oxapentacyclo[6.3.1.1$^{3,6}$.0$^{2,7}$.0$^{9,11}$]-tridec-4-yl ether, 60 grams of tetrahydrofuran, and 1.5 grams of boron trifluoride-diethyl ether complex. The resulting mixture is heated to 50° to 70° C. for about 3 hours after which period of time a viscous polymeric solution is obtained. A solution containing 0.6 gram of potassium hydroxide and 3.0 grams of water is added to said polymeric solution to thus neutralize the catalyst therein. To this admixture, there is added 75 grams of linseed oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 49

To a round-bottomed flask equipped with a reflux condenser and a nitrogen-inlet tube, there are added 50 grams of 10-oxapentacyclo[6.3.1.1$^{3,6}$.0$^{2,7}$.0$^{9,11}$]tridec-4,5-ylenedimethanol, 50 grams of tetrahydrofuran, and 1.0 gram of boron trifluoride-diethyl ether complex. The resulting mixture is heated to 50° to 70° C. for about 3 hours after which period of time a viscous polymeric solution is obtained. A solution containing 0.5 gram of potassium hydroxide and 3.0 grams of water is added to said polymeric solution to thus neutralize the catalyst therein. To this admixture, there is added 75 grams of linseed oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 50

To a round-bottomed flask equipped with a reflux condenser and a nitrogen-inlet tube, there are added 100 grams of 4-oxatetracyclo[6.2.1.0$^{2,7}$.0$^{3,5}$]undecane-9,10-diol, 75 grams of dioxane, and 2.0 grams of boron trifluoride-diethyl ether complex. The resulting mixture is heated to 50° to 70° C. for about 3 hours after which period of time a viscous polymeric solution is obtained. A solution containing 0.7 gram of potassium hydroxide and 3.0 grams of water is added to said polymeric solution to thus neutralize the catalyst therein. To this admixture, there is added 125 grams of soya bean oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 51

To a round-bottomed flask equipped with a reflux condenser and a nitrogen-inlet tube, there are added 40 grams of para-(2,3-epoxycyclopentyl)phenol, 30 grams of dioxane, and 1.0 gram of stannic octoate. The resulting mixture is heated to 50° to 70° C. for about 3 hours after which period of time a viscous polymeric solution is obtained. A solution containing 0.4 gram of potassium hydroxide and 3.0 grams of water is added to said polymeric solution to thus neutralize the catalyst therein. To this admixture, there is added 30 grams of soya bean oil acid and 30 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear and tough.

EXAMPLE 52

To a round-bottomed flask equipped with a reflux condenser and a nitrogen-inlet tube, there are added 40 grams of 10-oxapentacyclo[6.3.1.1$^{3,6}$.0$^{2,7}$.0$^{9,11}$]tridec-4-ylmethanol, 40 grams of dioxane, and 1.0 gram of boron trifluoride-diethyl ether complex. The resulting mixture is heated to 50° to 70° C. for about 3 hours after which period of time a viscous polymeric solution is obtained. A solution containing 0.5 gram of potassium hydroxide and 3.0 grams of water is added to said polymeric solution to thus neutralize the catalyst therein. To this admixture, there is added 30 grams of dehydrated castor oil acid and 50 grams of xylene, followed by heating the resulting admixture to between about 240° and 260° C. for 6 hours during which period of time the excess solvent and water are removed therefrom. After this, the resulting varnish solution is cooled and diluted with methyl isobutyl ketone. A film cured in the manner set forth in the discussion preceding the operative examples is hard, clear, and tough.

EXAMPLE 53

To a round-bottomed flask equipped with a reflux condenser and a nitrogen-inlet tube, there are added 40 grams of 10-oxapentacyclo[6.3.1.1$^{3,6}$.0$^{2,7}$.0$^{9,11}$]tridecan-4-ol, 40 grams of dioxane, and 1.0 gram of boron trifluoride-diethyl ether complex. The resulting mixture is heated to 50° to 70° C. for about 3 hours after which period of time a viscous polymeric solution is obtained. A solution containing 0.5 gram of potassium hydroxide and 3.0 grams of water is added to said polymeric solution to thus neutralize the catalyst therein. To this admixture, there is added 30 grams of tall oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 54

To a round-bottomed flask equipped with a reflux condenser and a nitrogen-inlet tube, there are added 60 grams of 10-oxapentacyclo[6.3.1.1$^{3,6}$.0$^{2,7}$.0$^{9,11}$]tridec-4-ylmethylene-oxyethanol, 50 grams of dioxane, and 0.8 gram of boron trifluoride-diethyl ether complex. The resulting mixture is heated to about 50° C. for about 2 hours after which period of time a viscous polymeric solution is obtained. A solution containing 0.3 gram of potassium hydroxide and 2.0 grams of water is added to said polymeric solution to thus neutralize the catalyst therein. To this admixture, there is added 40 grams of dehydrated castor oil acid and 40 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 55

To a round-bottomed flask equipped with a reflux condenser and a nitrogen-inlet tube, there are added 30 grams of 10-oxapentacyclo[6.3.1.1$^{3,6}$.0$^{2,7}$.0$^{9,11}$]tridecane-4,5-diol, 20 grams of dioxane, and 0.5 gram of boron trifluoride-diethyl ether complex. The resulting mixture is heated to about 70° C. for about 3 hours after which period of time a viscuos polymeric solution is obtained. A solution containing 0.3 gram of potassium hydroxide and 1.0 gram of water is added to said polymeric solution to thus neutralize the catalyst therein. To this admixture, there is added 30 grams of linseed oil acid and 30 grams of xylene, followed by heating the resulting admixture to between about 240° and 260° C. for 6 hours during which period of time the excess solvent and water are removed therefrom. After this, the resulting varnish solution is cooled and diluted with methyl ethyl ketone. A film cured in the manner set forth in the discussion preceding the operative examples is hard, clear, and tough.

EXAMPLE 56

To a round-bottomed flask equipped with a reflux condenser and a nitrogen-inlet tube, there are added 30 grams of 10-oxapentacyclo[6.3.1.1$^{3,6}$.0$^{2,7}$.0$^{9,11}$]tridec-4,5-ylenedimethanol, 30 grams of dioxane, and 0.7 gram of boron trifluoride-diethyl ether complex. The resulting mixture is heated to about 50° C. for about 3 hours after which period of time a viscous polymeric solution is obtained. A solution containing 0.3 gram of potassium hydroxide and 1.0 gram of water is added to said polymeric solution to thus neutralize the catalyst therein. To this admixture, there is added 25 grams of dehydrated castor oil acid and 40 grams of xylene, followed by heating the resulting admixture to between about 240° and 260° C. for 4 hours during which period of time the excess solvent and water are removed therefrom. After this, the resulting varnish solution is cooled and diluted with toluene. A film cured in the manner set forth in the discussion preceding the operative examples is hard, clear and tough.

EXAMPLE 57

To a round-bottomed flask equipped with a reflux condenser and a nitrogen-inlet tube, there are added 50 grams of 4-oxatetracyclo[6.2.1.0$^{2,7}$.0$^{3,5}$]undecane-9,10-diol, 40 grams of dioxane, and 1.0 gram of boron trifluoride-diethyl ether complex. The resulting mixture is heated to about 70° C. for about 2 hours after which period of time a viscous polymeric solution is obtained. A solution containing 0.3 gram of potassium hydroxide and 2.0 grams of water is added to said polymeric solution to thus neutralize the catalyst therein. To this admixture, there is added 50 grams of dehydrated castor oil acid and 40 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the

EXAMPLE 58

To a round-bottomed flask equipped with a reflux condenser and a nitrogen-inlet tube, there are added 20 grams of the isomeric diol mixture prepared as set forth in Example 7 supra, 20 grams of dioxane, and 0.5 gram of boron trifluoride-diethyl ether complex. The resulting mixture is heated to 50° to 70° C. for about 3 hours after which period of time a viscous polymeric solution is obtained. A solution containing 0.2 gram of potassium hydroxide and 1.0 gram of water is added to said polymeric solution to thus neutralize the catalyst therein. To this admixture, there is added 20 grams of tung oil acid and 30 grams of xylene, followed by heating the resulting admixture to between about 200° and 230° C. for 2 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 59

To a round-bottomed flask equipped with a reflux condenser and a nitrogen-inlet tube, there are added 50 grams of 2-hydroxyethyl 3-oxatricyclo[3.2.1.0$^{2,4}$]oct-7-yl ether, 50 grams of dioxane, and 1.0 gram of boron trifluoride-diethyl ether complex. The resulting mixture is heated to 50° to 70° C. for about 3 hours after which period of time a viscous polymeric solution is obtained. A solution containing 0.5 gram of potassium hydroxide and 3.0 grams of water is added to said polymeric solution to thus neutralize the catalyst therein. To this admixture, there is added 40 grams of dehydrated castor oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 60

To a round-bottomed flask equipped with a reflux condenser and a nitrogen-inlet tube, there are added 65 grams of 10-oxapentacyclo[6.3.1.1$^{3,6}$.0$^{2,7}$.0$^{9,11}$]tridec-4-ylmethylene-oxyethanol, 50 grams of dioxane, and 1.0 gram of boron trifluoride-diethyl ether complex. The resulting mixture is heated to 50° to 70° C. for about 3 hours after which period of time a viscous polymeric solution is obtained. A solution containing 0.5 gram of sodium hydroxide and 2.0 grams of water is added to said polymeric solution to thus neutralize the catalyst therein. To this admixture, there is added 35 grams of soya bean oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 61

To a round-bottomed flask equipped with a reflux condenser and a nitrogen-inlet tube, there are added 100 grams of 10-oxapentacyclo[6.3.1.1$^{3,6}$.0$^{2,7}$.0$^{9,11}$]tridec-4-oxyethanol, 75 grams of dioxane, and 2.0 grams of boron trifluoride-diethyl ether complex. The resulting mixture is heated to 50° to 70° C. for about 3 hours after which period of time a viscous polymeric solution is obtained. A solution containing 0.7 gram of potassium hydroxide and 3.0 grams of water is added to said polymeric solution to thus neutralize the catalyst therein. To this admixture, there is added 65 grams of safflower oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 62

To a round-bottomed flask equipped with a reflux condenser and a nitrogen-inlet tube, there are added 60 grams of 2,3-epoxycyclopentyl 2-hydroxyethyl ether, 40 grams of dioxane, and 1.0 gram of boron trifluoride-diethyl ether complex. The resulting mixture is heated to 50° to 70° C. for about 3 hours after which period of time a viscous polymeric solution is obtained. A solution containing 0.5 gram of potassium hydroxide and 3.0 grams of water is added to said polymeric solution to thus neutralize the catalyst therein. To this admixture, there is added 40 grams of dehydrated castor oil acid and 50 grams of xylene, followed by heating the resulting admixture to between about 240° and 260° C. for 6 hours during which period of time the excess solvent and water are removed therefrom. After this, the resulting varnish solution is cooled and diluted with cyclohexane. A film cured in the manner set forth in the discussion preceding the operative examples is hard, clear, and tough.

EXAMPLE 63

A mixture of 100 grams of 4-oxatetracyclo[6.2.1.0$^{2,7}$.0$^{3,5}$]undec-9-oxyethanol and 50 grams of dioxane was heated in a flask to about 50° C. To the resulting mixture, there was added slowly a solution which contained 2.0 grams of boron trifluoride-etherate dissolved in 49 grams of dioxane. After 4 hours at about 50° C., the reaction was essentially complete. The viscous reaction product mixture then was cooled, followed by pouring into 1 liter of ice water. There was observed a white solid precipitate which was recovered by filtration and dried. The yield of polyhydric polymeric product was 90 grams. A 50 weight percent solution of said polyhydric polymeric product in dimethylformamide possessed a viscosity of 250 centipoises at 25° C. The polyhydric polymeric product had a softening range of from about 150° to about 170° C.

The polyhydric polymeric product (81 grams) and 54 grams of dehydrated castor oil acid were heated in the presence of xylene at about 245° C. for about 4 hours. During this period of time, the water produced from the esterification reaction was removed, and the acid number was reduced to 3.0. The reaction product mixture then was cooled, and xylene was added thereto to dilute the varnish system to 58 percent total solids. At this concentration, the resulting solution had a viscosity of 6 centipoises at 25° C.

EXAMPLE 64

Coatings (0.7 mil.) prepared by using the varnish solution of Example 63 and cured in the manner set forth in the discussion preceding the operative examples using 0.01 weight percent cobalt (cobalt octoate) and 0.5 weight percent lead (lead octoate), followed by heating for 30 minutes at 350° F., possessed excellent resistance to caustic, boiling water, and sulfuric acid. These coatings had a Sward hardness value of 80 and an impact of greater than 108 inch pounds.

EXAMPLE 65

A catalyst solution containing 2.0 grams of boron trifluoride-etherate in 25 grams of dioxane was added slowly to a reaction vessel which contained a mixture of 100 grams of 2,3-epoxycyclopentanol and 75 grams of dioxane, under stirring, and at a temperature of about 25° C. Subsequently, the resulting admixture was maintained at a temperature of about 40° C. for a period of 2 hours. After this period of time, 5 grams of water which contained 1.0 gram of potassium hydroxide was added to the viscous polymeric solution to thus neutralize the catalyst therein. Dehydrated castor oil acid (100 grams; Baker acid 9-11) was added to said polymeric solution, followed by heating the resulting admixture to about 250° C. After 3 hours, the acid number was 4.9. The varnish product was cooled to about room temperature and diluted with about 230 grams of xylene. The resulting varnish solution had a viscosity of 400 centipoises at 25° C., and a total solids content of 46.4 percent.

EXAMPLE 66

To a reaction vessel, there were added 200 grams of 4-oxatetracyclo[6.2.1.0$^{2,7}$.0$^{3,5}$]undecan-9-ol (96.9 percent pure as determined by the pyridine hydrochloride method of analysis) and 100 grams of benzene. A solution containing 4.0 grams of boron trifluoride-etherate and 50 grams of dioxane was added slowly over a 20 minute period to the resulting mixture (maintained at about 50° C.). The tempertaure of the admixture increased due to the exothermic nature of the reaction and consequently, the temperature of said reaction mixture was maintained at about 70° C. by cooling or heating as required. Subsequently, the reaction product mixture separated into two phases, i.e., polymeric product and benzene. Dioxane (100 grams) was added to said reaction product mixture to redissolve the polymeric product therein. After 2 hours, 147 grams of dimethylformamide was added as solvent, and dioxane and benzene was removed by distillation. The resulting viscous polymeric product was poured into about 1 liter of water whereupon a white, solid polymer precipitated therefrom. After drying said polymer at about 100° C., a yield of 184 grams (of polymer) was obtained. This polyhydric polymeric product melted at about 230° to 240° C. A weight percent solution of said product in dimethylformamide possessed a viscosity of 900 centiposies at 25° C.

The above prepared polyhydric polymeric product (90 grams) plus 90 grams of dehydrated castor oil acid (Baker acid 9-11) and a small amount of xylene were added to a reaction vessel and then heated to about 245° C. Water produced during the esterification reaction was removed by distillation. Nitrogen was bubbled into the resulting reaction mixture to avoid premature oxidative cross-linking at the reactive ethylenic sites in the fatty acid. After about 4 hours, the reaction product mixture had an acid number of 5.3. Subsequently, the reaction product mixture was cooled to about 25° C. and xylene was added thereto. The resulting varnish solution contained 44.6 percent solids and had a viscosity of 900 centiposises at 25° C.

EXAMPLE 67

Coatings (0.7mil) prepared by using the varnish solution of Example 66 and cured in the manner set forth in the discussion preceding the operative examples using 0.01 weight percent cobalt (cobalt octoate) and 0.5 weight percent lead (lead octoate), followed by heating for 30 minutes at 350° F. possessed excellent resistance to caustic, boiling water, and sulfuric acid. These coatings had a Sward hardness value of 90 and an impact of greater than 108 inch pounds.

EXAMPLE 68

To a 1-liter flask, there were added 300 grams of 4-oxatetracyclo[6.2.1.0$^{2,7}$.0$^{3,5}$]undecan-9-ol and 100 grams of dioxane. The resulting admixture was heated to about 40° C., followed by adding slowly a solution of 6.0 grams of boron trifluoride-etherate and 50 grams of dioxane thereto. Thereafter, the reaction mixture was maintained at about 50° to 70° C. for 1.5 hours. At the end of this period of time, the reaction product mixture was very viscous. To facilitate stirring of said reaction product mixture, 150 grams of dioxane and 100 grams of dimethylformamide were added thereto. This polyhydric polymeric solution was then poured into 1 liter of water which resulted in a white polyhydric polymeric precipitate. After drying said white polyhydric polymeric solid, the yield was 293 grams. The hydroxyl number (weight percent of hydroxy groups) was 9.3, and the softening temperature was 240° to 260° C. A 50 weight percent solution of the polyhydric polymeric product in dimethylformamide had a viscosity of 750 centiposies at 25° C.

A mixture containing 233 grams of the above prepared polyhydric polymeric product and 233 grams of dehydrated castor oil acid (Baker acid 9-11) was heated to about 245° C. for 4 hours. After this period of time, the acid number was 4.1, and a solution of the resulting esterified reaction product in xylene which contained 57 percent total solids had a viscosity of 675 centipoises at 25° C. Coatings prepared in the manner described preceding the operative examples were hard and tough; their resistance to water and caustic solutions were excellent.

EXAMPLE 69

The esterification products of Example 68 were heated to 255° C. for an additional 4 hours. Then sufficient xylene was added thereto to give a varnish solution which at 32.6 percent total solids possessed a viscosity of 400 centiposies at 25° C. This Example 69 clearly illustrates that the additional heating period caused polymerization through the reactive ethylenic sites. Clear baked films of 1.0 mil thickness had a Sward hardness value of 79, an impact of greater than 108 inch pounds, and excellent water and caustic resistance. These films had excellent color stability upon exposure to ultraviolet light.

EXAMPLE 70

(A) A mixture of 82 grams of the polyhydric polymeric product prepared as set forth in Example 66 supra, 68 grams of dehydrated castor oil acid (Baker acid 9-11), and 30 grams of xylene were charged to a 1-liter flask fitted with a stirrer, a nitrogen purge line, a thermometer, and a distillation head. The resulting admixture was heated to 240° to 245° C. for 4 hours during which period of time water resulting from the esterification reaction was removed at the still head. The resulting reaction product mixture then was cooled to about room temperature and sufficient xylene was added thereto to give a varnish solution which contained 47.7 percent solids. The acid number was 5 and the viscosity at 25° C. was 800 centipoises.

(B) A control (a commercial epoxy type varnish) was prepared in the following manner. This varnish (control) was obtained by esterifying a polymeric glycidyl ether of bis(4-hydroxyphenyl)-2,2-propane (60 parts by weight) with dehydrated castor oil acid (40 parts by weight) at 225° to 250° C. for about 4 hours. The polymeric glycidyl ether employed had a molecular weight of about 1800 to 2,000. The resulting varnish had the following properties:

Solids _____ 50 percent.
Solvent _____ Xylene.
Viscosity (Gardner-Holdt) _____ T-V.
Acid number, maximum _____ 3.

A coating of the varnish solution of paragraph A supra was compared with a similar coating of the varnish solution (control) of paragraph B supra. The pertinent data and results are set forth in Table I below:

Table I

| Varnish Solution | Acid Resistance | Sward Hardness | Ultraviolet Stability |
|---|---|---|---|
| A | Excellent; essentially no change. | [a] 84 | Slight yellowing after 2 weeks. |
| B | Slight haze and slight softening. | [b] 42-48 | Deep yellowing after 4 days. |

[a] Air dried at about 24° C. for 7 days using cobalt octoate.
[b] Air dried at about 24° C. for 9 days using cobalt octoate.

Reasonable variations and modification of the invention can be made or carried out in the light of the above disclosure without departing from the spirit and scope thereof.

What is claimed is:

1. A liquid to fusible solid polyhydric polymer selected from the group consisting of homopolymers of monoepoxy alcohol compounds, and copolymers of a mixture of monoepoxy alcohol compounds, said monoepoxy alcohol compounds being of the group consisting of:

(a) 4-oxatetracyclo[6.2.1.0$^{2,7}$.0$^{3,5}$]undecan-9-ol,
(b) 4-oxatetracyclo[6.2.1.0$^{2,7}$.0$^{3,5}$]undec-9-oxyalkanol,
(c) 4-oxatetracyclo[6.2.1.0$^{2,7}$.0$^{3,5}$]undec-9-oxyalkanepoly-ol which contains up to six alcoholic hydroxy groups,
(d) 4-oxatetracyclo[6.2.1.0$^{2,7}$.0$^{3,5}$]undecane-9,10-diol,
(e) 4-oxatetracyclo[6.2.1.0$^{2,7}$.0$^{3,5}$]undecane-10,11-diol,
(f) 10-oxapentacyclo[6.3.1.1$^{3,6}$.0$^{2,7}$.0$^{9,11}$]tridecan-4-ol,
(g) 10-oxapentacyclo[6.3.1.1$^{3,6}$.0$^{2,7}$.0$^{9,11}$]tridecane-4,5-diol,
(h) 10-oxapentacyclo[6.3.1.1$^{3,6}$.0$^{2,7}$.0$^{9,11}$]tridec-4-ylalkanol,
(i) 10-oxapentacyclo[6.3.1.1$^{3,6}$.0$^{2,7}$.0$^{9,11}$]tridec-4,5-ylene-dialkanol,
(j) 10-oxapentacyclo[6.3.1.1$^{3,6}$.0$^{2,7}$.0$^{9,11}$]tridec-4-oxyalkanol,
(k) 10-oxapentacyclo[6.3.1.1$^{3,6}$.0$^{2,7}$.0$^{9,11}$]tridec-4-oxyalkanepoly-ol which contains up to six alcoholic hydroxy groups,
(l) 10-oxapentacyclo[6.3.1.1$^{3,6}$.0$^{2,7}$.0$^{9,11}$]tridec-4-ylmethylene-oxyalkanol,
(m) 10-oxapentacyclo[6.3.1.1$^{3,6}$.0$^{2,7}$.0$^{9,11}$]tridec-4-ylmethylene-oxyalkane-poly-ol which contains up to six alcoholic hydroxy groups,
(n) the 4-oxatetracyclo[6.2.1.0$^{2,7}$.0$^{3,5}$]undec-9-oxy(mono- and polyalkyleneoxy)alkanols,
(o) the 4-oxatetracyclo[6.2.1.0$^{2,7}$.0$^{3,5}$]undec-9,10-ylene-di[oxy(mono- and polyalkyleneoxy)alkanols],
(p) the 4-oxatetracyclo[6.2.1.0$^{2,7}$.0$^{3,5}$]undec-10,11-ylene-di[oxy(mono- and polyalkyleneoxy)alkanols],
(q) the 10-oxapentacyclo[6.3.1.1$^{3,6}$.0$^{2,7}$.0$^{9,11}$]tridec-4-oxy(mono- and polyalkyleneoxy)alkanols,
(r) the 10-oxapentacyclo[6.3.1.1$^{3,6}$.0$^{2,7}$.0$^{9,11}$]tridec-4,5-ylene-di[oxy(mono- and polyalkyleneoxy)alkanols],
(s) 10-oxapentacyclo[6.3.1.1$^{3,6}$.0$^{2,7}$.0$^{9,11}$]tridec-4-ylalkyleneoxyalkanol,
(t) the 10-oxapentacyclo[6.3.1.1$^{3,6}$.0$^{2,7}$.0$^{9,11}$]tridec-4-ylalkyleneoxy(mono- and polyalkyleneoxy)alkanols,
(u) 10-oxapentacyclo[6.3.1.1$^{3,6}$.0$^{2,7}$.0$^{9,11}$]tridec-4,5-ylene-di(alkyleneoxyalkanol), and
(v) the 10 - oxapentacyclo[6.3.1.1$^{3,6}$.0$^{2,7}$.0$^{9,11}$]tridec-4,5 - ylene - di[alkyleneoxy(mono- and polyalkyleneoxy)alkanols]; said polyhydric polymer being characterized in that (1) it contains a plurality of alcoholic hydroxy groups, and (2) the polymer chain of said polyhydric polymer being formed by the reaction of an alcoholic hydroxy group with a vicinal epoxy group of the aforesaid mono-epoxy alcohol compounds.

2. The composition of claim 1 wherein said polyhydric polymer is a homopolymer of the monoepoxy alcohol compounds enumerated as (a) to (v), respectively.

3. The esterification reaction products obtained by reacting, at a temperature in the range of from about 100° C. to about 300° C., the liquid to fusible solid polyhydric polymers defined in claim 1, with an aliphatic monocarboxylic acid which contains at least 4 carbon atoms.

4. The esterification reaction products obtained by reacting, at a temperature in the range of from about 100° C. to about 300° C., the liquid to fusible solid polyhydric polymers defined in claim 2, with an aliphatic monocarboxylic acid which contains at least 4 carbon atoms.

5. A liquid to fusible solid homopolymer of 4-oxatetracyclo[6.2.1.0$^{2,7}$.0$^{3,5}$]undecan-9-ol, said homopolymer being characterized in that it contains a plurality of alcoholic hydroxy groups, the polymer chain of said homopolymer being formed by the reaction of an alcoholic hydroxy group with a vicinal epoxy group of said 4-oxatetracyclo[6.2.1.0$^{2,7}$.0$^{3,5}$]undecan-9-ol.

6. The esterification reaction products obtained by reacting, at a temperature in the range of from about 100° C. to about 300° C., the homopolymer defined in claim 5 with ethylenically unsaturated monocarboxylic acid which contains at least 4 carbon atoms, in amounts so as to provide from about 0.1 to 1.0 carboxy group of said acid per hydroxy group of said homopolymer.

7. The esterification reaction products of claim 6 wherein said ethylenically unsaturated monocarboxylic acid is an acid derived from a naturally occurring oil.

8. The esterification reaction products of claim 7 wherein said acid is dehydrated castor oil acid.

9. The esterification reaction products of claim 7 wherein said acid is soybean oil acid.

10. The esterification reaction products of claim 7 wherein said acid is tall oil acid.

11. A liquid to fusible solid homopolymer of 4-oxatetracyclo[6.2.1.0$^{2,7}$.0$^{3,5}$]undecane - 9,10 - diol, said homopolymer being characterized in that it contains a plurality of alcoholic hydroxy groups, the polymer chain of said homopolymer being formed by the reaction of an alcoholic hydroxy group with a vicinal epoxy group of said 4-oxatetracyclo[6.2.1.0$^{2,7}$.0$^{3,5}$]undecane-9,10-diol.

12. The esterification reaction products obtained by reacting, at a temperature in the range of from about 100° C. to about 300° C., the homopolymer defined in claim 11 with ethylenically unsaturated monocarboxylic acid which contains at least 4 carbon atoms, in amounts so as to provide from about 0.1 to 1.0 carboxy group of said acid per hydroxy group of said homopolymer.

13. A liquid to fusible solid homopolymer of 10-oxapentacyclo[6.3.1.1$^{3,6}$.0$^{2,7}$.0$^{9,11}$]tridecan-4 - ol, said homopolymer being characterized in that it contains a plurality of alcoholic hydroxy groups, the polymer chain of said homopolymer being formed by the reaction of an alcoholic hydroxy group with a vicinal epoxy group of said [6.3.1.1$^{3,6}$.0$^{2,7}$.0$^{9,11}$]tridecan-4-ol.

14. The esterification reaction products obtained by reacting, at a temperature in the range of from about 10° C. to about 300° C., the homopolymer defined in claim 13 with ethylenically unsaturated monocarboxylic acid which contains at least 4 carbon atoms, in amounts so as to provide from about 0.1 to 1.0 carboxy group of said acid per hydroxy group of said homopolymer.

15. A liquid to fusible solid homopolymer of 4-oxatetracyclo[6.2.1.0$^{2,7}$.0$^{3,5}$]undec-9-oxyalkanol, said homopolymer being characterized in that it contains a plurality of alcoholic hydroxy groups, the polymer chain of said homopolymer being formed by the recation of an alcoholic hydroxy group with a vicinal epoxy group of said 4-oxatetracyclo[6.2.1.0$^{2,7}$.0$^{3,5}$]undec-9-oxyalkanol.

16. The esterification reaction products obtained by reacting, at a temperature in the range of from about 100° C. to about 300° C., the homopolymer defined in claim 15 with ethylenically unsaturated monocarboxylic acid which contains at least 4 carbon atoms, in amounts so as to provide from about 0.1 to 1.0 carboxy group of said acid per hydroxy group of said homopolymer.

17. A liquid to fusible solid homopolymer of 4-oxatetracyclo[6.2.1.0$^{2,7}$.0$^{3,5}$]undec-9-oxy(mono and polyalkyleneoxy)alkanols, said homopolymer being characterized in that it contains a plurality of alcoholic hydroxy groups, the polymer chain of said homopolymer being formed by the reaction of an alcoholic hydroxy group with a vicinal epoxy group of said 4-oxatetracyclo[6.2.1.0$^{2,7}$.0$^{3,5}$]undec-9-oxy(mono and polyalkyleneoxy)alkanols.

18. The esterification reaction products obtained by reacting, at a temperature in the range of from about 100° C. to about 300° C., the homopolymer defined in claim 17 with ethylenically unsaturated monocarboxylic acid which contains at least 4 carbon atoms, in amounts so as to provide from about 0.1 to 1.0 carboxy group of said acid per hydroxy group of said homopolymer.

19. The esterification reaction products obtained by reacting, at a temperature in the range of from about 100° C. to about 300° C., (A) a liquid to fusible solid polyhydric polymer selected from the group consisting of homopolymers of monoepoxy alcohol compounds and copolymers of a mixture of monoepoxy alcohol compounds, said monoepoxy alcohol compounds being characterized in that (1) they contain at least one alcoholic hydroxyl group, (2) they contain a sole oxirane oxygen atom bonded to vicinal cycloaliphatic carbon atoms, (3) they are free of ethylenic, acetylenic, and benzenoid unsaturation, and (4) they contain solely carbon, hydrogen, and oxygen atoms; said polyhydric polymer being characterized in that (1) it contains a plurality of alcoholic hydroxy groups, and (2) the polymer chain of said polyhydric polymer being formed by the reaction of an alcoholic hydroxy group with a vicinal epoxy group of the aforesaid monoepoxy alcohol compounds; and (B) an aliphatic monocarboxylic acid which contains at least 4 carbon atoms.

References Cited by the Examiner

UNITED STATES PATENTS

| | | | |
|---|---|---|---|
| Re. 24,047 | 8/1955 | Crecelius | 206—2 XR |
| 2,457,329 | 12/1948 | Swern et al. | 260—2 |
| 2,925,403 | 2/1960 | Shokal | 260—2 XR |
| 2,927,934 | 3/1960 | Greenspan | 260—348 |
| 2,935,516 | 5/1960 | Fostick et al. | 260—2 XR |
| 2,966,479 | 12/1960 | Fischer | 260—2 XR |
| 3,005,832 | 10/1961 | Payne et al. | 260—348 |
| 3,014,048 | 12/1961 | Tinsley et al. | 260—348 |
| 3,042,686 | 7/1962 | O'Brien et al. | 260—348 |
| 3,071,562 | 1/1963 | Price et al. | 260—2 XR |
| 3,071,600 | 1/1963 | Tinsley | 260—348 |

WILLIAM H. SHORT, *Primary Examiner.*

HAROLD N. BURSTEIN, JOSEPH L. SCHOFER,
*Examiners.*